(12) United States Patent
Chen et al.

(10) Patent No.: US 7,520,324 B2
(45) Date of Patent: Apr. 21, 2009

(54) COMPLETION APPARATUS FOR MEASURING STREAMING POTENTIALS AND DETERMINING EARTH FORMATION CHARACTERISTICS

(75) Inventors: Min-Yi Chen, Pearland, TX (US); Bhavani Raghuraman, Wilton, CT (US); Ian Bryant, Stafford, TX (US); Michael G. Supp, Middlebury, CT (US); Jose Navarro, Oslo (NO)

(73) Assignee: Schlumberger Technology Corporation, Ridgefield, CT (US)

( * ) Notice: Subject to any disclaimer, the term of this patent is extended or adjusted under 35 U.S.C. 154(b) by 40 days.

(21) Appl. No.: 10/871,446

(22) Filed: Jun. 18, 2004

(65) Prior Publication Data

US 2005/0279497 A1    Dec. 22, 2005

(51) Int. Cl.
*E21B 47/06* (2006.01)
(52) U.S. Cl. .................. 166/254.2; 175/50; 324/368; 324/351; 73/152.05
(58) Field of Classification Search ............. 175/50; 324/368, 348–351; 166/254.2; 73/152.05
See application file for complete search history.

(56) References Cited

U.S. PATENT DOCUMENTS

| | | | |
|---|---|---|---|
| 2,281,960 A | 5/1942 | Vacquier | |
| 2,400,678 A | 5/1946 | Archie | 324/351 |
| 2,433,746 A | 12/1947 | Doll | 175/182 |
| 2,569,625 A | 10/1951 | Malcolm | |
| 2,588,717 A | 3/1952 | Goodwin | |
| 2,669,690 A | 2/1954 | Doll | 324/367 |
| 2,725,282 A | 11/1955 | Stuart et al. | |
| 2,728,047 A | 12/1955 | Doll | 324/1 |
| 2,814,017 A | 11/1957 | Doll | 324/1 |
| 3,268,801 A | 8/1966 | Clements et al. | 324/10 |

(Continued)

FOREIGN PATENT DOCUMENTS

EP         43768 A1    1/1982

(Continued)

OTHER PUBLICATIONS

Bryant et al. *Real-Time Monitoring and Control of Water Influx to a Horizontal Well Using Advanced Completion Equipped with Permanent Sensors.* SPE 77522 SPE Annual Technical Conference and Exhibition, San Antonio, Texas (Sep. 29-Oct. 2, 2002).

(Continued)

*Primary Examiner*—Richard E Chilcot, Jr.
*Assistant Examiner*—Matthew J. Smith
(74) *Attorney, Agent, or Firm*—James McAleenan; Vincent Loccisano; David Gordon

(57) ABSTRACT

Earth formations are characterized by using an array of electrodes which can measure streaming potentials in the formation, and by interpreting the data obtained by the electrodes. The electrodes are placed on a wireline tool, a LWD tool, or in a fixed manner about a completed wellbore. The measured streaming potentials are generated by drilling with an overbearing pressure, slitting the mudcake in a borehole, acid injection, or any of various other manners which causes fluid movement. The data obtained is interpreted to locate fractures, measure formation permeability, estimate formation pressure, monitor drilling fluid loss, detect abnormal pressure, etc. Particularly, a streaming potential voltage transient having a double peak profile signifies the presence of a formation fracture.

18 Claims, 34 Drawing Sheets

ELECTRODES MOUNTED ON INSULATED
JOINT SECTIONS OF A SAND-SCREEN COMPLETION

U.S. PATENT DOCUMENTS

| | | | |
|---|---|---|---|
| 3,453,530 A | 7/1969 | Georges | |
| 3,454,870 A | 7/1969 | Norman, Jr. | |
| 3,596,511 A | 8/1971 | Hart | |
| 3,599,085 A | 8/1971 | Semmelink | 324/1 |
| 3,638,105 A * | 1/1972 | Schuster | 324/351 |
| 3,638,484 A | 2/1972 | Tixier | |
| 3,784,900 A | 1/1974 | Schuster | |
| 3,896,413 A | 7/1975 | Dowling et al. | |
| 3,914,686 A | 10/1975 | Brooks | |
| 4,019,125 A | 4/1977 | Daniel | |
| 4,048,495 A | 9/1977 | Ellis | |
| 4,233,839 A | 11/1980 | Coates | |
| 4,245,313 A | 1/1981 | Coates | |
| 4,369,497 A | 1/1983 | Poupon et al. | |
| 4,420,975 A | 12/1983 | Nagel et al. | |
| 4,427,944 A | 1/1984 | Chandler | 324/353 |
| 4,495,604 A | 1/1985 | Clavier et al. | |
| 4,575,681 A | 3/1986 | Grosso et al. | |
| 4,600,059 A | 7/1986 | Eggleston et al. | |
| 4,628,202 A | 12/1986 | Minette | |
| 4,716,973 A * | 1/1988 | Cobern | 175/50 |
| 4,791,618 A | 12/1988 | Pruchnik | |
| 4,831,600 A | 5/1989 | Hornby et al. | |
| 4,882,542 A | 11/1989 | Vail, III | |
| 5,008,625 A | 4/1991 | Chen | |
| 5,043,668 A * | 8/1991 | Vail, III | 324/368 |
| 5,103,178 A | 4/1992 | Desbrandes | 324/351 |
| 5,200,705 A * | 4/1993 | Clark et al. | 175/50 |
| 5,214,384 A | 5/1993 | Sprunt et al. | |
| 5,242,020 A | 9/1993 | Cobern | |
| 5,302,781 A | 4/1994 | Hanson, III | |
| 5,402,069 A | 3/1995 | Tabanou et al. | |
| 5,417,104 A | 5/1995 | Wong | 73/38 |
| 5,497,321 A | 3/1996 | Ramakrishnan et al. | |
| 5,502,686 A * | 3/1996 | Dory et al. | 175/50 |
| 5,503,001 A | 4/1996 | Wong | 73/38 |
| 6,061,634 A | 5/2000 | Belani et al. | 702/12 |
| 6,105,690 A | 8/2000 | Bilgin et al. | |
| 6,225,806 B1 | 5/2001 | Millar et al. | |
| 6,376,838 B1 | 4/2002 | Odom | |
| 6,452,395 B1 | 9/2002 | Clarke et al. | 324/323 |
| 6,454,870 B1 | 9/2002 | Brooks | 134/3 |
| 6,714,138 B1 | 3/2004 | Turner et al. | |
| 6,933,726 B2 * | 8/2005 | Chen et al. | 324/351 |
| 6,978,672 B1 | 12/2005 | Chen et al. | 73/152.17 |
| 6,997,257 B2 * | 2/2006 | Snoga | 166/254.2 |
| 7,233,150 B2 * | 6/2007 | Chen et al. | 324/351 |
| 7,243,718 B2 * | 7/2007 | Chen et al. | 166/252.5 |
| 2004/0124841 A1 | 7/2004 | Omeragic | 324/337 |
| 2005/0279161 A1 | 12/2005 | Chen et al. | 73/152.05 |
| 2005/0280419 A1 | 12/2005 | Chen et al. | 324/324 |
| 2006/0089804 A1 | 4/2006 | Chen et al. | 702/1 |

FOREIGN PATENT DOCUMENTS

WO    WO02/053871    7/2002

OTHER PUBLICATIONS

Fordham et al. Crossflow Filtration of Bentonite Suspensions. Physico-Chemical Hydrodynamics, 11(4) 411-439 (1989).

* cited by examiner

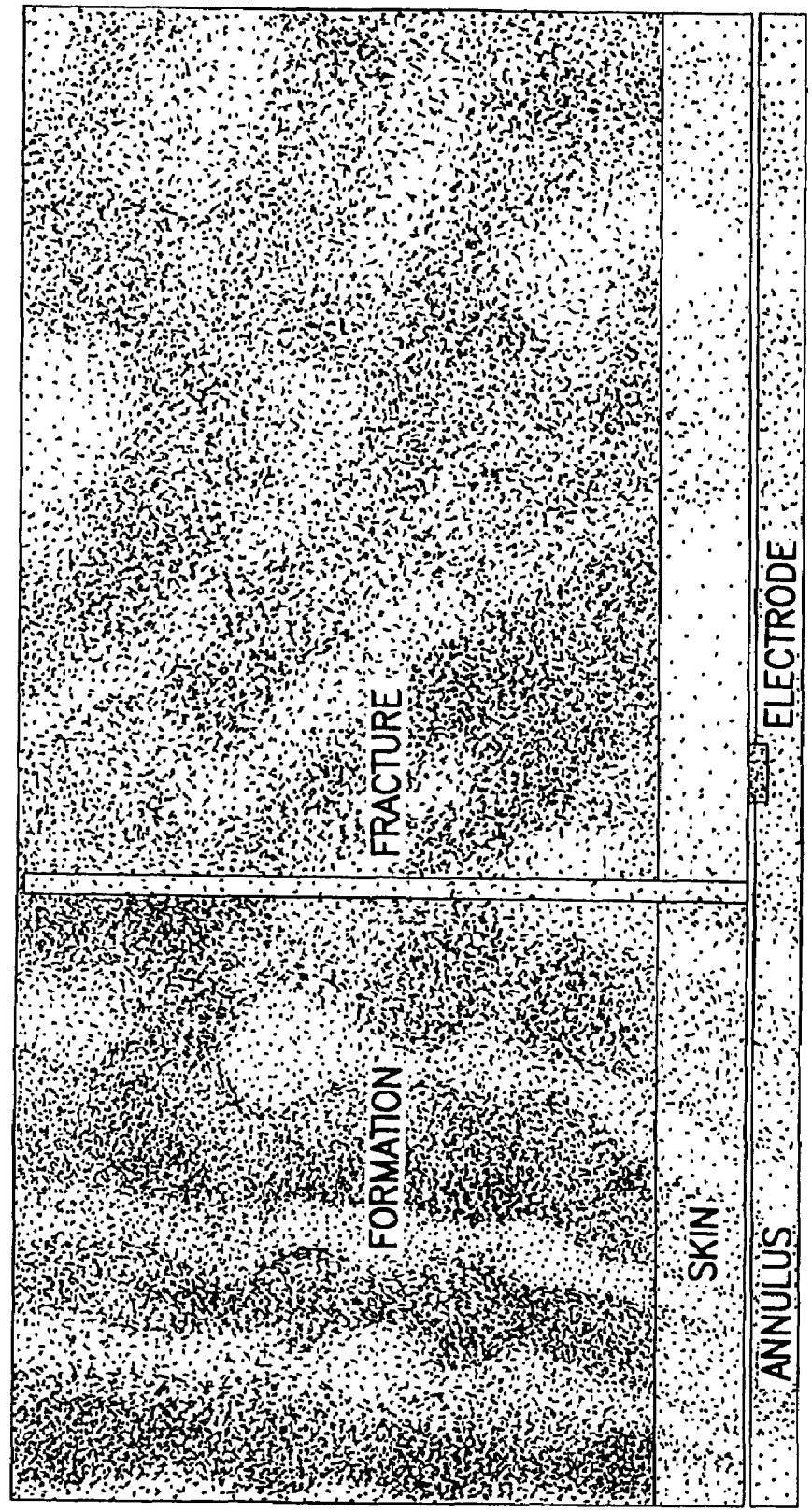
FIG. 9c FRACTURE MODEL FOR HORIZONTAL PRODUCER

CASING WITH ISOLATED SECTIONS AS ELECTRODES

WIRELINE PERMEABILITY TOOL

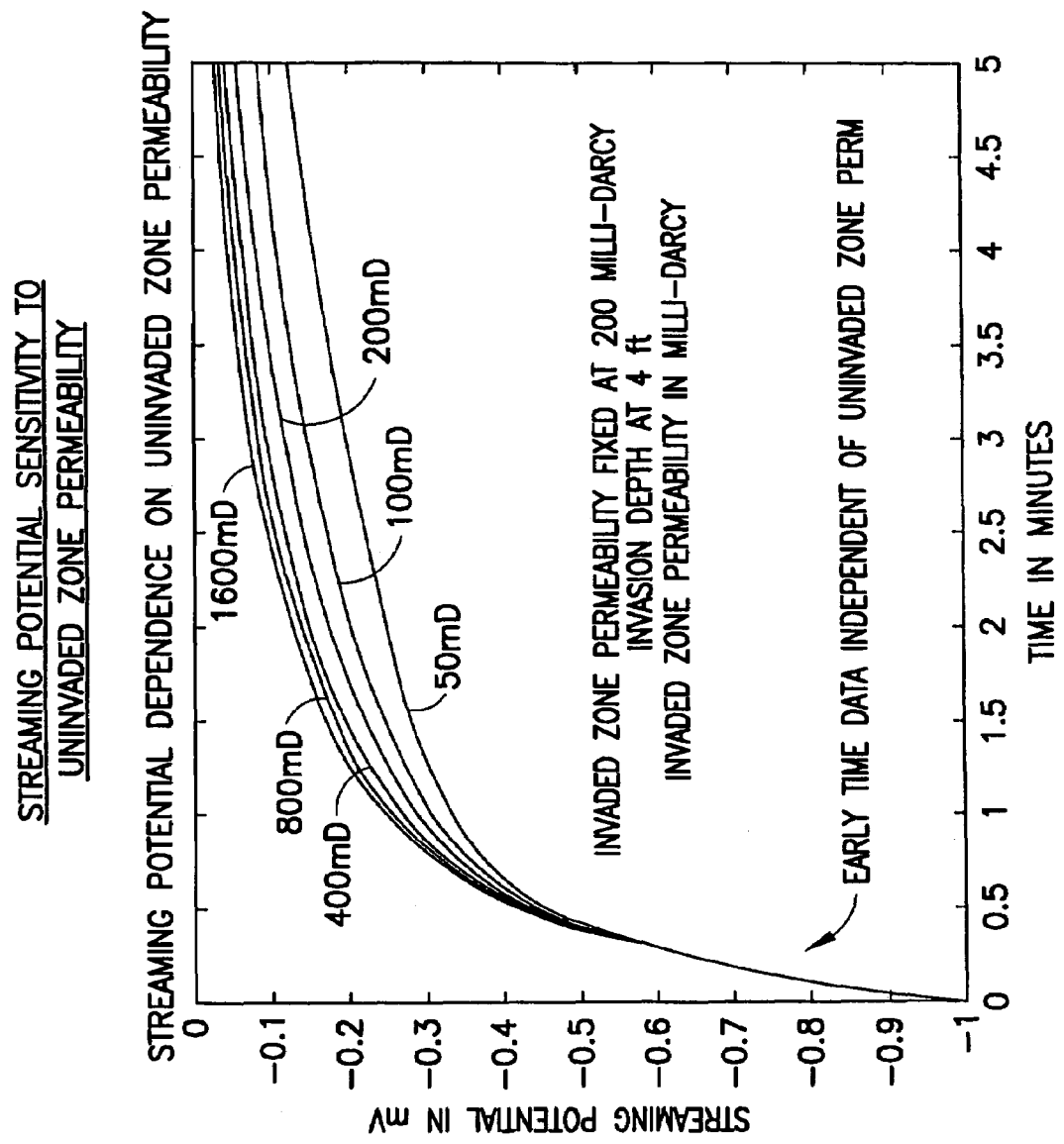

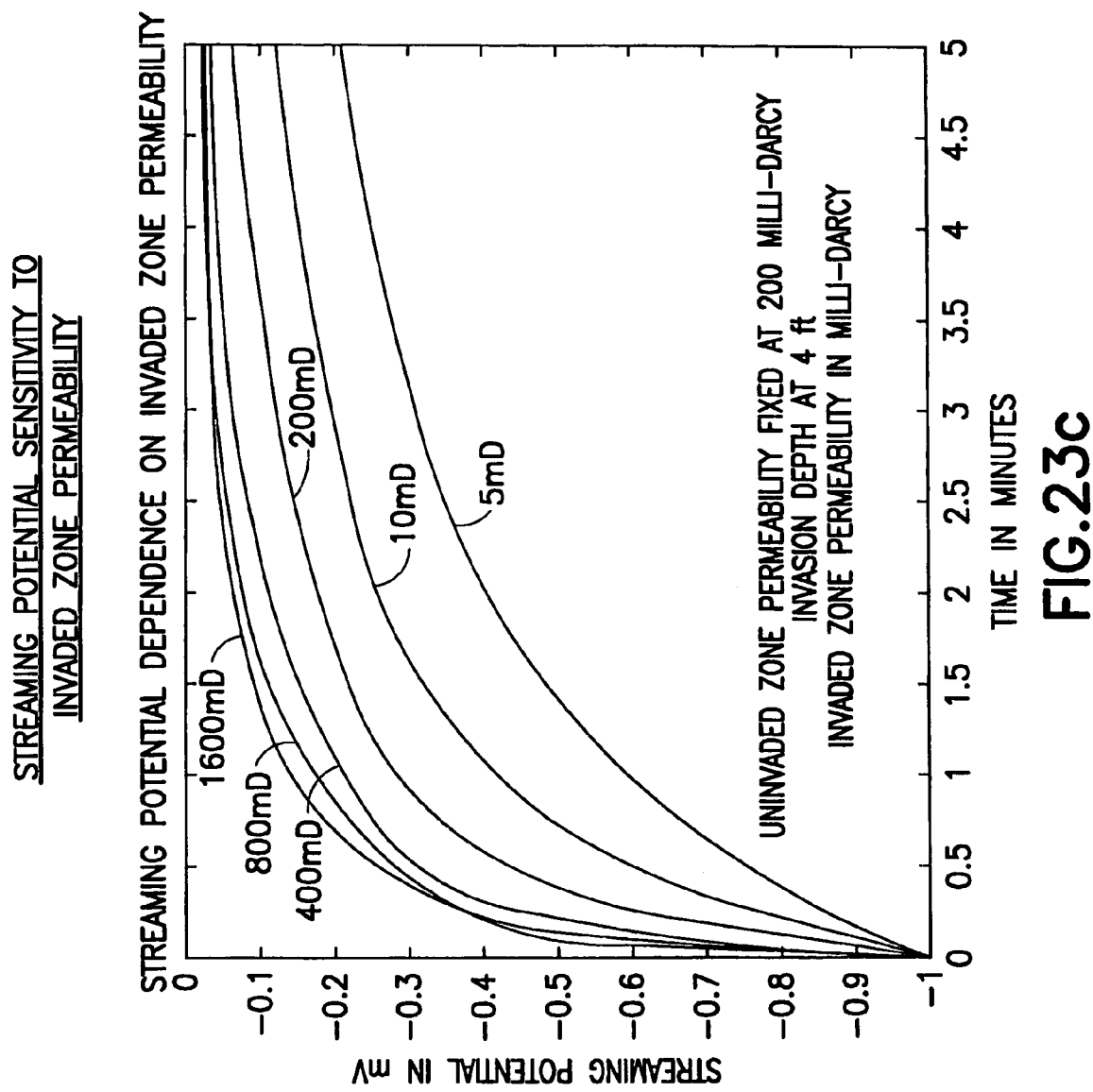

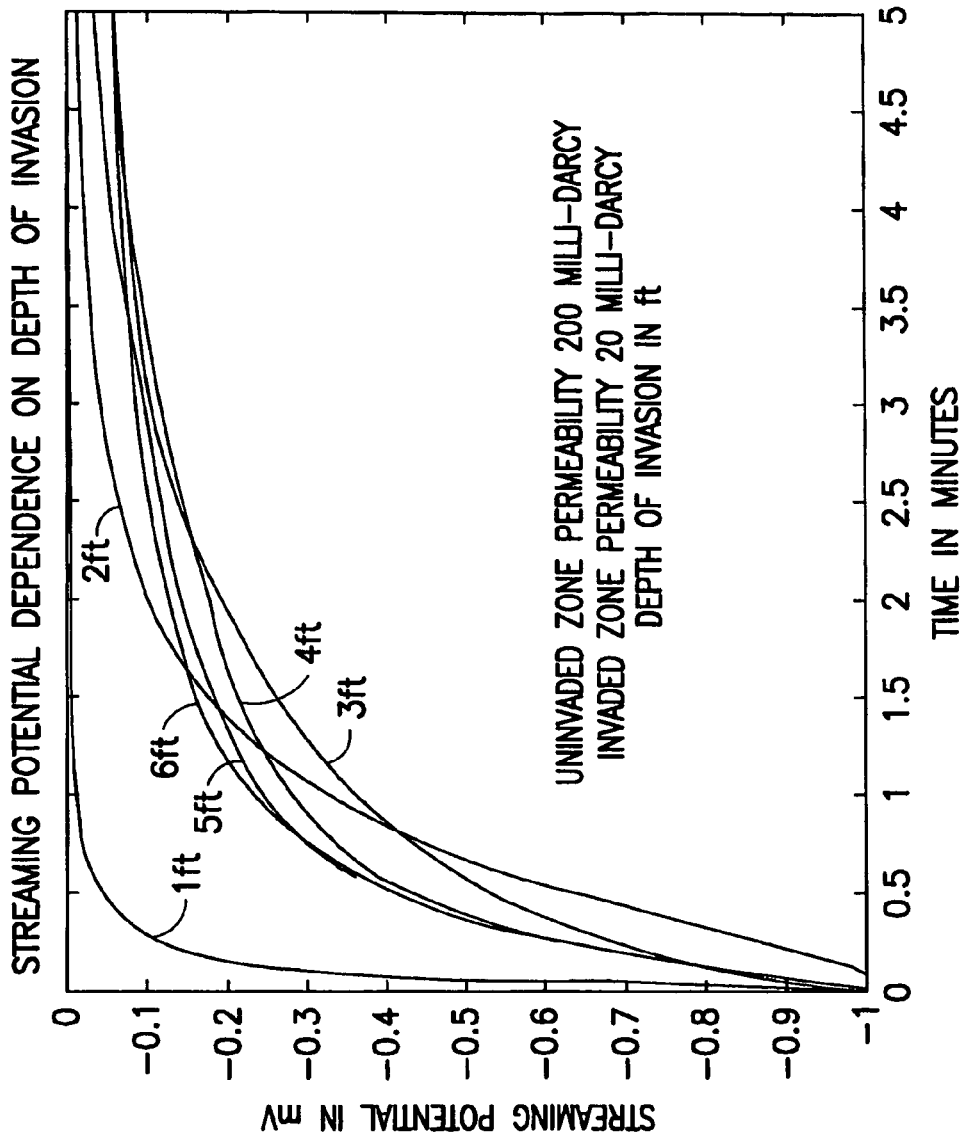

COMPLETION APPARATUS FOR MEASURING STREAMING POTENTIALS AND DETERMINING EARTH FORMATION CHARACTERISTICS

CROSS-REFERENCE TO RELATED APPLICATIONS

This patent application is related to commonly-assigned U.S. patent application Ser. No. 10/871,856, now U.S. Pat. No. 7,233,150 entitled "WHILE DRILLING APPARATUS FOR MEASURING STREAMING POTENTIALS AND DETERMINING EARTH FORMATION CHARACTERISTICS"; commonly-assigned U.S. patent application Ser. No. 10/871,854, entitled "WIRELINE APPARATUS FOR MEASURING STREAMING POTENTIALS AND DETERMINING EARTH FORMATION CHARACTERISTICS" now issued as U.S. Pat. No. 6,978,672; and commonly assigned U.S. patent application Ser. No. 10/872,112, now U.S. Pat. No. 7,243,718 entitled "METHODS FOR LOCATING FORMATION FRACTURES AND MONITORING WELL COMPLETION USING STREAMING POTENTIAL TRANSIENTS INFORMATION"; each such U.S. Patent Application being simultaneously filed herewith.

BACKGROUND OF THE INVENTION

1. Field of the Invention

This invention relates broadly to the hydrocarbon industry. More particularly, this invention relates to apparatus and methods for measuring streaming potentials resulting from pressure transients in an earth formation traversed by a borehole. This invention also relates to manners of making determinations regarding earth formation characteristics as a result of streaming potential measurements. One such characteristic is the permeability of the formation at different depths thereof, although the invention is not limited thereto.

2. State of the Art

The history with respect to the possibility of making streaming potential measurements in a downhole formation is a long one. In U.S. Pat. No. 2,433,746, (1947) Doll suggested that vigorous vibration of a downhole apparatus in a borehole could generate pressure oscillations and fluid movement relative to the formation which in turn could give rise to measureable streaming potentials due to an electrokinetic potential phenomenon. In U.S. Pat. No. 2,814,017, (1957) Doll suggested methods for investigating the permeabilities of earth formations by observing the differences in phase between periodic pressure waves passed through the formations and potentials generated by the oscillatory motion of the formation fluid caused by these pressure waves. Conversely, a periodically varying electric current was suggested to be used to generate oscillatory motion of the formation fluid, which in turn generated periodic pressure waves in the formation. Measurements were to be made of the phase displacement between the generating and the generated quantities and a direct indication of the relative permeability of the formation thereby obtained.

In U.S. Pat. No. 3,599,085, to A. Semmelink, entitled, "Apparatus For Well Logging By Measuring And Comparing Potentials Caused By Sonic Excitation", (1971) the application of low-frequency sonic energy to a formation surface was proposed so as to create large electrokinetic, or streaming, pulses in the immediate area of the sonic generator. In accordance with the disclosure of that patent, the electrokinetic pulses result from the squeezing (i.e. the competition of viscosity and inertia) of the formation, and the streaming potential pulses generate periodic movements of the formation fluid relative to the formation rock. The fluid movement produces detectable electrokinetic potentials of the same frequency as the applied sonic energy and having magnitudes at any given location directly proportional to the velocity of the fluid motion at that location and inversely proportional to the square of the distance from the locus of the streaming potential pulse. Since the fluid velocity was found to fall off from its initial value with increasing length of travel through the formation at a rate dependent in part upon the permeability of the formation rock, it was suggested that the magnitude of the electrokinetic potential at any given distance from the pulse provided a relative indication of formation permeability. By providing a ratio of the electrokinetic potential magnitudes (sinusoidal amplitudes) at spaced locations from the sonic generator, from which electrokinetic skin depth may be derived, actual permeability can in turn be determined.

In U.S. Pat. No. 4,427,944, (1984) Chandler suggested a stationary-type borehole tool and method for determining formation permeability. The borehole tool includes a pad device which is forced into engagement with the surface of the formation at a desired location, and which includes means for injecting fluid into the formation and electrodes for measuring electrokinetic streaming potential transients and response times resulting from the injection of the fluid. The fluid injection is effectively a pressure pulse excitation of the formation which causes a transient flow to occur in the formation. Chandler suggests a measurement of the characteristic response time of the transient streaming potentials generated in the formation by such flow in order to derive accurate information relating to formation permeability.

In U.S. Pat. No. 5,503,001 (1996), Wong proposed a process and apparatus for measuring at finite frequency the streaming potential and electro-osmotic induced voltage due to applied finite frequency pressure oscillations and alternating current. The suggested apparatus includes an electromechanical transducer which generates differential pressure oscillations between two points at a finite frequency and a plurality of electrodes which detect the pressure differential and streaming potential signal between the same two points near the source of the pressure application and at the same frequency using a lock-in amplifier or a digital frequency response analyzer. According to Wong, because the apparatus of the invention measures the differential pressure in the porous media between two points at finite frequencies close to the source of applied pressure (or current), it greatly reduces the effect of background caused by the hydrostatic pressure due to the depth of the formation being measured.

Despite the long history and multiple teachings of the prior art, it is believed that in fact, prior to field measurements made in support of instant invention, no downhole measurements of streaming potential transients in actual oil fields have ever been made. The reasons for the lack of actual implementation of the proposed prior art embodiments are several. According to Wong, neither the streaming potential nor the electro-osmotic measurement alone is a reliable indication of formation permeability, especially in formations of low permeability. Wong states that attempts to measure the streaming potential signal with electrodes at distances greater than one wavelength from each other are flawed since pressure oscillation propagates as a sound wave and the pressure difference would depend on both the magnitude and the phase of the wave, and the streaming potential signal would be very much lower since considerable energy is lost to viscous dissipation over such a distance. In addition, Wong states that application of a DC flow to a formation and measurement of the response voltage in the time domain will not work in low permeability formations since the longer response time and very low streaming potential signal is dominated by drifts of the electrodes' interfacial voltage over time. Thus, despite the theoretical possibilities posed by the prior art, the conventional wisdom of those skilled in the art (of which Wong's comments are indicative) is that useful streaming potential measurements are not available due to low signal levels, high noise levels, poor spatial resolution, and poor long-term stability. Indeed, it is difficult to obtain pressure transient data with high spatial resolution as the borehole is essentially an isobaric region. The pressure sensor placed inside the borehole cannot give detailed information on the pressure transients inside the formation if the formation is heterogeneous. To do so, it is necessary to segment the borehole into hydraulically isolated zones, a difficult and expensive task to perform. Further, it will be appreciated that some of the proposed tools of the prior art, even if they were to function as proposed, are extremely limited in application. For example, the Chandler device will work only in drilled boreholes prior to casing and requires that the tool be stationed for a period of time at each location where measurements are to be made. Thus, the Chandler device cannot be used as an MWD/LWD (measurement or logging while drilling) device, is not applicable to finished wells for making measurements during production, and cannot even be used on a moving string of logging devices.

SUMMARY OF THE INVENTION

It is therefore an object of the invention to provide methods and apparatus for measuring streaming potential in an earth formation.

It is another object of the invention to provide methods and apparatus for measuring streaming potentials in a formation while drilling a borehole.

It is a further object of the invention to provide methods and apparatus for measuring streaming potentials in a formation around a device permanently installed in a wellbore.

It is also an object of the invention to provide methods and apparatus for measuring streaming potentials in a formation with a moving borehole tool.

It is an additional object of the invention to provide methods of determining formation characteristics using streaming potentials measurements.

Another object of the invention is to provide methods of characterizing fractures in a formation using streaming potential measurements.

A further object of the invention is to provide methods of determining one or more of formation permeability, skin permeability, effective fracture permeability, and horizontal and vertical permeabilities of a formation using streaming potential measurements.

In accord with these objects, which will be discussed in detail below, different methods and apparatus for measuring streaming potential in an earth formation are provided. A first embodiment of the invention relates to measuring streaming potential while drilling a borehole. For purposes herein, measurement-while-drilling (MWD) and logging-while-drilling (LWD) applications will be considered interchangeable. A second embodiment of the invention relates to measuring streaming potential with a borehole tool which is adapted to make measurements while moving through the borehole. A third embodiment of the invention relates to measuring streaming potential with apparatus which is permanently installed (e.g., cemented) about the wellbore. All embodiments of the invention can be utilized to find characteristics of the formation. In particular, since the streaming potential measurement relates directly to fluid flow, the streaming potential measurements can be used to track flow of fluids in the formation. In turn, this information may be used to find the permeability of the formation in different strata about the borehole and/or to find and characterize fractures in the formation.

Additional objects and advantages of the invention will become apparent to those skilled in the art upon reference to the detailed description taken in conjunction with the provided figures.

BRIEF DESCRIPTION OF THE DRAWINGS

FIG. 9b is a plot of streaming potentials generated by the forward model of FIG. 9a.

FIG. 9c is a schematic representing a forward model of a fractured formation.

FIG. 18b is a plot of streaming potentials generated by the forward model of FIG. 18a.

FIG. 23b is a plot of streaming potentials generated by the forward model of FIG. 23a with respect to an uninvaded zone.

FIG. 23c is a plot of streaming potentials generated by the forward model of FIG. 23a with respect to an invaded zone.

FIG. 23d is a plot generated by the forward model of FIG. 23a of the sensitivity of the streaming potential with respect to depth of invasion.

DETAILED DESCRIPTION OF THE PREFERRED EMBODIMENTS

Figure 1:
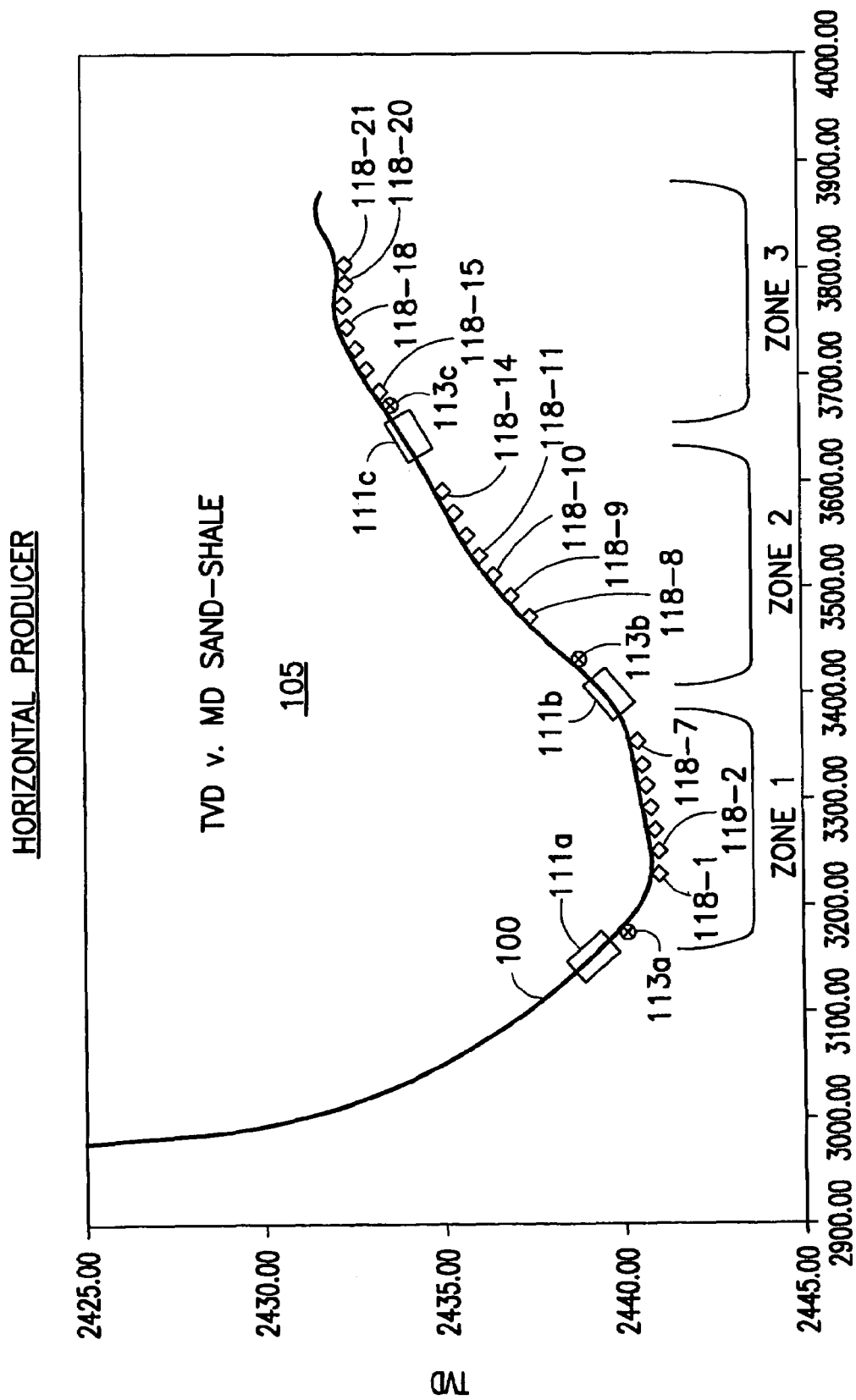
FIG. 1 is a schematic diagram of a completed horizontal well having electrodes deployed thereabout for purposes of measuring streaming potentials.

Prior to turning to the Figures, some theoretical considerations governing the physics of the invention are useful. In reservoir rocks there exists a thin charged double layer at the interface between the rock matrix and the water in the pore. The matrix surface is negatively charged, and the water is positively charged. When water moves under a pressure gradient $\nabla p$, an electrical current $i_e$ is created with the water current. The electrical current is proportional to the water current, which is proportional to the pressure gradient:

$$i_e = L \nabla p. \tag{1}$$

where L is a coupling constant which is a property of the rock.

Pressure transients are created in the formation by many different operations that occur over the lifetime of a well such as drilling, mud invasion, cementing, water and acid injection, fracturing, and oil and gas production. Pressure transient testing is an established technique to determine reservoir properties such as permeability, reservoir size, and communication between different zones and between different wells. As is set forth below, streaming potential transients associated with the pressure transients can also be used to determine these properties.

The modeling of the reservoir pressure p can be carried out with multiphase flow models. For the modeling of the streaming potential, it is useful to start with the diffusion equation of a single-phase flow:

$$\nabla \cdot \frac{k}{\mu} \nabla p = \phi c \frac{\partial}{\partial t} p, \tag{2}$$

where k is the permeability, $\mu$ is the viscosity, $\phi$ is the porosity, and c is the fluid compressibility. From the modeled pressure field p, the streaming potential V can be calculated by solving the Poisson Equation:

$$-\nabla \cdot \sigma \nabla V = \nabla \cdot L \nabla p, \tag{3}$$

where $\sigma$ is the electrical conductivity.

From Eq. (2) it follows that the time $\Delta t$ for a pressure transient and the associated streaming potential transient created at the borehole surface to diffuse through a distance $\Delta x$ into the formation is given by $$\Delta t \sim \frac{\phi c \mu}{k} (\Delta x)^2. \tag{4}$$

The early time pressure and streaming potential transients are sensitive mainly to reservoir properties near the borehole, and the late time transients are sensitive to reservoir properties both near the borehole and farther away from the borehole. By interpreting the measured transients in a time ordered fashion, reservoir properties at different distances to the borehole can be determined. The interpretation of pressure transients in this time ordered fashion is an established art. For example, early time pressure transients are used to determine damage to permeabilities or "skin", and late time pressure transients are used to determine reservoir boundaries.

The applications are much more limited if the steady state values of the streaming potentials are the only measurements available. At a steady state, equation (2) becomes $$\nabla \cdot \frac{k}{\mu} \nabla p = 0. \tag{5}$$

The pressure drop $\Delta p$ across a depth interval $\Delta x$ is then proportional to $$\Delta p \propto \frac{\mu}{k} \Delta x. \tag{6}$$

The drop in the streaming potential $\Delta V$ is related to $\Delta p$ by $$\Delta V = -\frac{L}{\sigma} \Delta p \tag{7}$$

which is proportional to $$\Delta V \propto \frac{L\mu}{\sigma k} \Delta x. \tag{8}$$

The steady state streaming potential can only give information on the average value of a reservoir property and as a result is dominated by intervals with high values of $(L\mu)/(\sigma k)$. It is believed that in the presence of a mudcake, the steady state streaming potential is dominated by the mudcake and is insensitive to reservoir properties. The permeability of the mudcake is extremely low, and the steady state pressure drop mainly exists across the mudcake.

While in principle it is possible to determine reservoir properties at all distances to the borehole (i.e., radially from the borehole) by interpreting the transients in a time ordered fashion, the critical question in practice is whether the measurements can be made with sufficient quality: accuracy, spatial resolution, and stability over long time. It is difficult to get pressure transient data with high spatial resolution as the borehole is essentially an isobaric region. A pressure sensor placed inside the borehole cannot give detailed information on the pressure transients inside the formation if the formation is heterogeneous. To do so, it would be necessary to segment the borehole into hydraulically isolated zones, a difficult and expensive task to perform. On the other hand, the borehole is not an equipotential surface for electric current flow. Thus, streaming potential transients may be measured by an array of electrodes placed inside the borehole and electrically isolated (i.e., insulated) one from the other and can provide equivalent information to that of hydraulically isolated zone pressure transient testing because the streaming potential is determined by the pressure gradient. In fact, by utilizing an array of isolated streaming potential electrodes, the streaming potential can be measured with a higher spatial resolution than hydraulically isolated zone pressure transient testing.

Given the theoretical understandings above, according to one aspect of the invention, insulated electrodes are deployed in or about a borehole or a well in order to measure streaming potential transients. According to different embodiments of the invention, and as will be discussed in more detail below, the electrodes may be deployed on insulated sections of a drill pipe in while-drilling (MWD or LWD) applications, or on the body of a tool which is moved through the borehole in wireline logging applications. In post-completion applications, the electrodes may be deployed on an insulating sonde placed in an open hole for an open-hole completion, or on (or as part of) centralizers in sand-screen completions, or in insulation surrounding a casing in a cemented completion. In a cased-hole completion with electrically isolated casing sections, the metal casings can serve as electrodes. Regardless of how the electrodes are deployed, DC voltage differences indicative of streaming potentials are measured between a reference electrode and other electrodes of an array. Initial voltage difference values between the reference electrode and other electrodes typically due to surface chemistry differences of the electrodes are subtracted from all data subsequent to the creation of pressure transients.

According to another aspect of the invention, the streaming potential transients are generated in any of various manners. According to one embodiment of the invention associated with drilling a borehole, the pressure difference between the formation and the borehole creates mud invasion, pressure transients and streaming potential transients. In another embodiment of the invention associated with wireline logging of the borehole, streaming potential transients are generated by providing the wireline tool with one or more cutting edges mounted on one or more retractable arms which cut slits across the mudcake while logging. Because of a large overbalancing pressure difference between the formation and the borehole, when the mudcake is slit, fluid will flow through the slit and the resulting pressure transient can be measured. According to another embodiment of the invention associated with completion and post-completion applications, streaming potential transients are generated by injection of completion fluid, cement, gravel, acids, fracturing propellant, water injection testing, production testing, etc. In fact, any change in the rate of production will also create streaming potential transients. As long as there is a flow of conducting fluids associated with pressure transients, a streaming potential transient will be created and will be measurable with high precision using the deployed electrodes.

According to another aspect of the invention, data related to streaming potential transients obtained by the electrodes is interpreted to provide useful information. Those skilled in the art will appreciate that the interpretation of pressure transient data (as opposed to streaming potential transient data) to obtain reservoir properties such as permeability is a well-established art. In formations with high permeability, the pressure transients change with time rapidly, while in formations with low permeability, the pressure transients change slowly. The streaming potential transients produced by the pressure transients depend on the formation permeability in the same way as the pressure transients.

As will be appreciated by those skilled in the art, there exist analytical and numerical tools to model the pressure transients. The reservoir parameters of interest can be determined by varying the parameters in the model until the calculated pressure matches with the measured data. Formally, let R denote the set of reservoir parameters to be determined, and let $f_p(R)$ denote the modeled pressure transient. A mismatch between the modeled and the measured pressure transient is defined:

$$E_p(R)=\|f_p(R)-p\|. \tag{9}$$

The mismatch is minimized at $R=R_0$ to get the inverted values of the reservoir parameters.

The quantitative interpretation of streaming potential data to determine reservoir parameters such as formation permeability can be carried out in the same way as the interpretation of the pressure transient data. Let s denote a set of measured transients. The set may contain only the streaming potential transients V, or it may contain both the streaming potential transients and the pressure transients. Let $f_s(R,L)$ denote the modeled transients, which depend on an additional set of parameters: the coupling constants L in equation (3). (The conductivity σ in equation (3) is usually known from resistivity logging data.) A mismatch between the modeled and the measured pressure transients is defined according to:

$$E_s(R,L)=\|f_s(R,L)-s\|. \tag{10}$$

The mismatch is minimized at $R=R_0$ and $L=L_0$ to get the inverted values of the reservoir parameters.

It will be appreciated by those skilled in the art that the Poisson equation (3) is linear in the coupling constants L, since the coupling of the streaming potential back into the governing equations for the pressure by electro-osmosis is completely negligible. Therefore, the inversion for the coupling constants is a straightforward linear inversion. Indeed, the minimization of equation (10) is carried out in two steps. The first step is to fix R and vary L, and find the sub-optimal minimum of the mismatch by solving a linear problem for L. The solution gives L as a function of R. The sub-optimal minimum is then a function of R only:

$$E_{s1}(R)\equiv E_s(R,L(R)). \tag{11}$$

The second step is a nonlinear search for the minimum of equation (11), containing the same number of unknowns as equation (9). Therefore, the additional task of estimating the coupling constants does not add to the computational complexity or mathematical uncertainly to the inversion problem.

According to another aspect of the invention, the measured streaming potential transients associated with the fluid movement in the formation can be used inter alia to: track movement of cement slurries during cementing thereby detecting possible cementing problems; track slurries carrying gravel thereby monitoring gravel packing; track acid movement during injection of acid into the formation as acid injection will create streaming potential transients; monitor fracturing of formations in real time; evaluate fracture jobs quantitatively; track water movement resulting from water injection; improve the effectiveness of pressure transient testing; and monitor reservoir parameter changes over long periods of time, including water saturation, relative permeability and water cut.

Using the various aspects of the invention previously described, field tests were run on a horizontal production well, part of which is shown schematically in FIG. 1. The horizontal production well 100 of FIG. 1 was completed in formation 105 with sand screens 114 (see FIG. 2) and segmented into three zones with external casing packers 111a, 111b, 111c. The zone closest to the heel of the horizontal well is labeled as Zone 1, the middle zone as Zone 2, and the zone closest to the toe as Zone 3. Each zone was provided with a valve unit 113a, 113b, 113c respectively, extending through the screen 114, with two pressure sensors 115-1 and 115-2 associated with each valve unit 113 (see FIG. 2). Electrodes 118 were deployed as discussed below.

Figure 2:
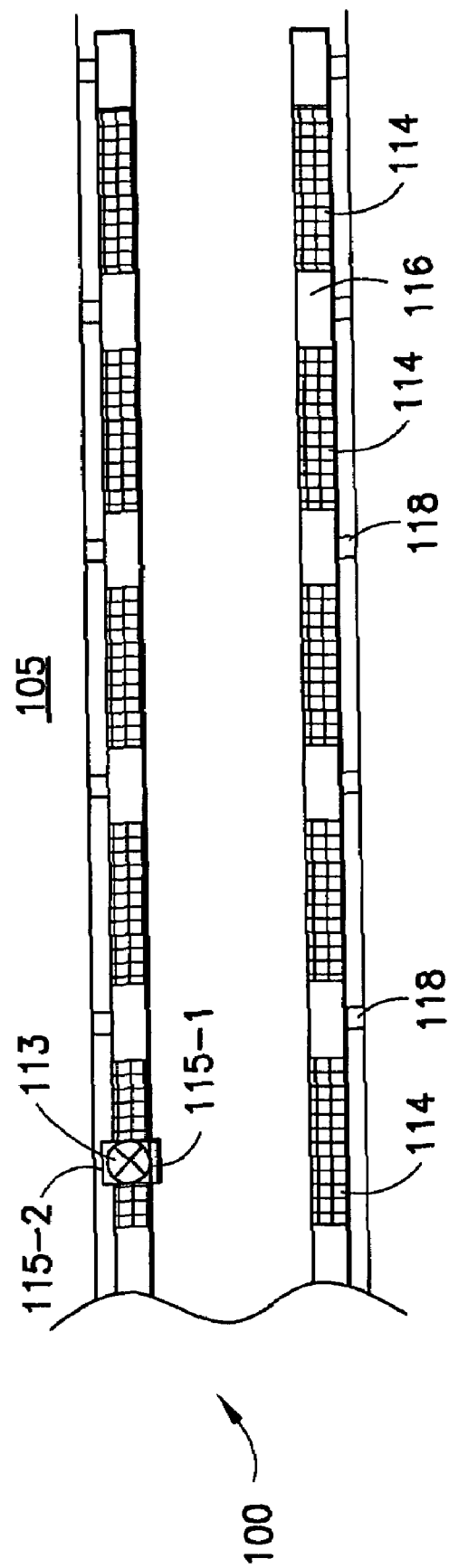
FIG. 2 is a schematic diagram of electrodes mounted on insulated joint sections of the sand-screen completion of FIG. 1.

Turning now to FIG. 2, deployment of the electrodes 118 according to the invention is seen. As seen in FIG. 2, the well 100 is completed with sand-screen sections 114 which are coupled together by insulated joint sections 116 to form the completion string. It will be appreciated that the screen sections cannot be electrically insulated from the formation 105 or from the annulus fluid (not shown). The joint sections 116 are electrically insulated. Mounted in the middle of each joint section is a centralizer 118. Because of the weight of the completion string 114,116, the centralizers 118 are always in good contact with the formation 105. Therefore, in accord with the invention, the centralizers 118 are equipped as electrodes with preferably high impedance voltage measurement circuits and are coupled to surface electronics by cable wires (not shown). Appropriate centralizer hardware is described in PCT Application WO 02/053871.

It will be appreciated by those skilled in the art that the completion string, being made of metal, forms a short circuit for electrical currents. The screen sections 114 used to complete well 100 were fifteen feet long, and the joint sections 116 were five feet long. Since the insulated joint sections 116 of the completion string covered only a small area near the electrodes 118, much of the electrical currents were able to leak through the exposed screen sections 114, resulting in the reduction of signal level. However, as shown hereinafter, there still existed significant levels of signal to be measured. It should be noted that for quantitative interpretation, it is sufficient to include the current leakage in the forward modeling.

As shown in FIG. 1, seven electrodes were provided per zone for a total of twenty-one electrodes (labeled 118-1, 118-2 . . . , 118-21. With a fifteen foot screen section and a five foot joint section, the distance between neighboring electrodes in the same zone was approximately twenty feet. The distance between the nearest two electrodes in different zones was just over one hundred feet.

Figure 3:
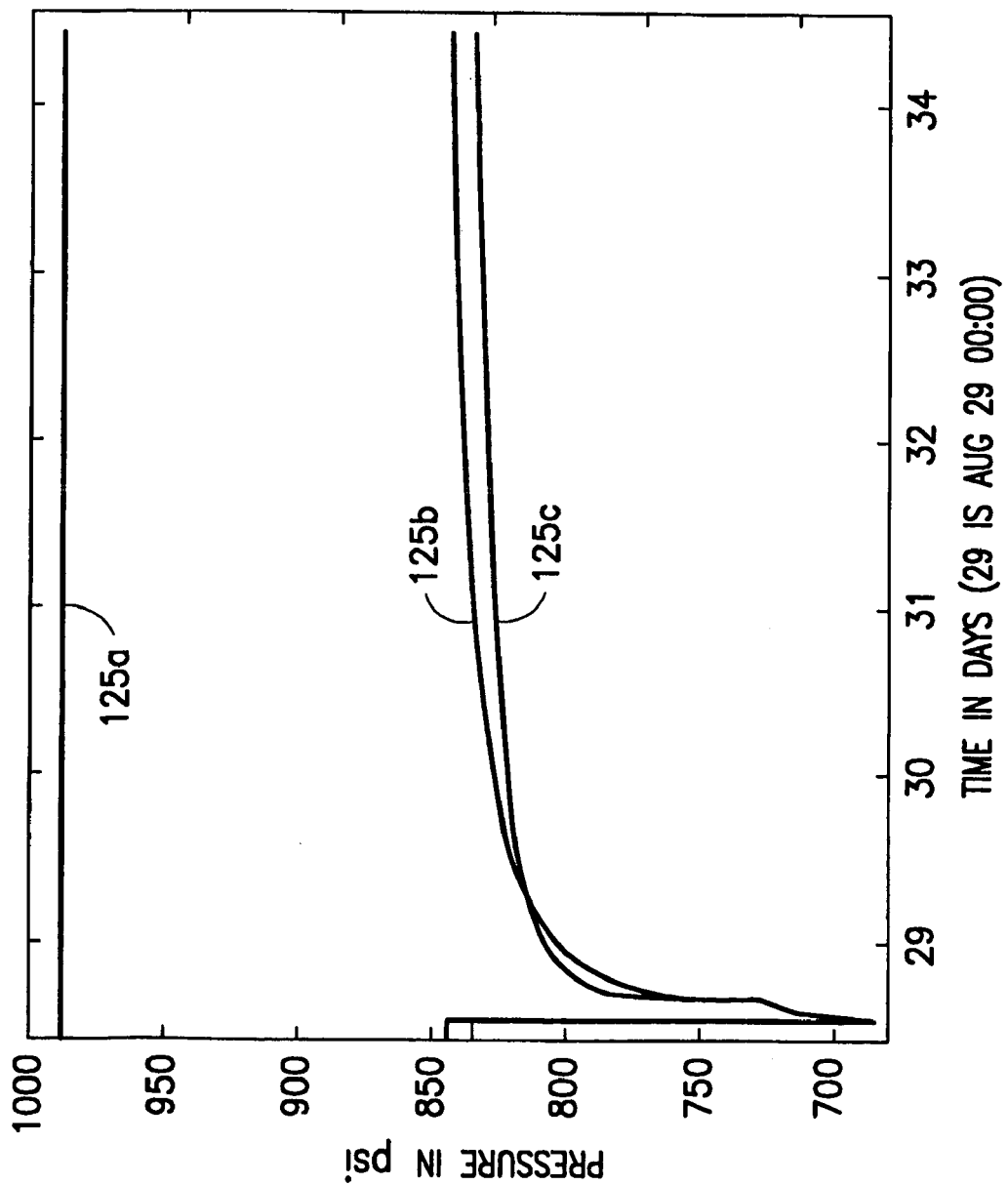
FIG. 3 is a plot of pressure transients measured for two of the zones shown in FIG. 1.

Pressure testing data gathered by the pressure gauges on both sides of the completion string showed that Zone 1 is hydraulically isolated from Zone 2 and Zone 3. This is seen in FIG. 3, since Zone 1 pressure 125a is significantly higher than Zone 2 and Zone 3 pressures 125b, 125c thereby indicating isolation. Therefore, for the voltages of the electrodes in Zone 1(118-1 through 118-7), the reference electrode was chosen to be in Zone 2 or Zone 3, and for the voltages of the electrodes in Zone 2 and Zone 3, the reference electrode was chosen to be in Zone 1.

In order to create a streaming potential transient, the three electrical valves 113a, 113b, 113c, and a rod pump (not shown) at the formation surface were utilized to control the fluid flow. The fluid in the annulus of each zone flowed into the tubing through the valve opening. The pressure gauge 115-1 on the tubing side of the opening measured the tubing pressure, and the pressure gauge 115-2 on the annulus side measured the pressure in the annulus region between the formation and the screen. By turning the pump on and off and by opening and closing the valves 113, pressure transients were created in the formation 105 and measured by the pressure gauges 115-2 on the annulus side.

For each of the three zones, the annulus pressure was equal to the formation pressure. As seen in FIG. 3, the Zone 2 and Zone 3 annulus pressures 125b, 125c were approximately equal, indicating that the two zones are in hydraulic communication. The Zone 1 annulus pressure 125a was higher, indicating that Zone 1 is hydraulically isolated. By pumping the fluid out of the borehole, the tubing pressure was kept at a value ~150 psi lower than the annulus pressures in Zone 2 and Zone 3. The Zone 2 valve and the Zone 3 valve were opened for three hours and then shut. The Zone 2 annulus pressure, shown as curve 125a in FIG. 3, dropped 150 psi (from approximately 840 psi to approximately 690 psi) to the level of the tubing pressure immediately after the valve opening, and then started to build up back to the formation pressure. The Zone 3 annulus pressure is shown as curve 125b in FIG. 3. The Zone 3 pressure buildup curve rose faster than the Zone 2 pressure buildup curve, indicating that Zone 3 is more permeable than Zone 2.

Figure 4:
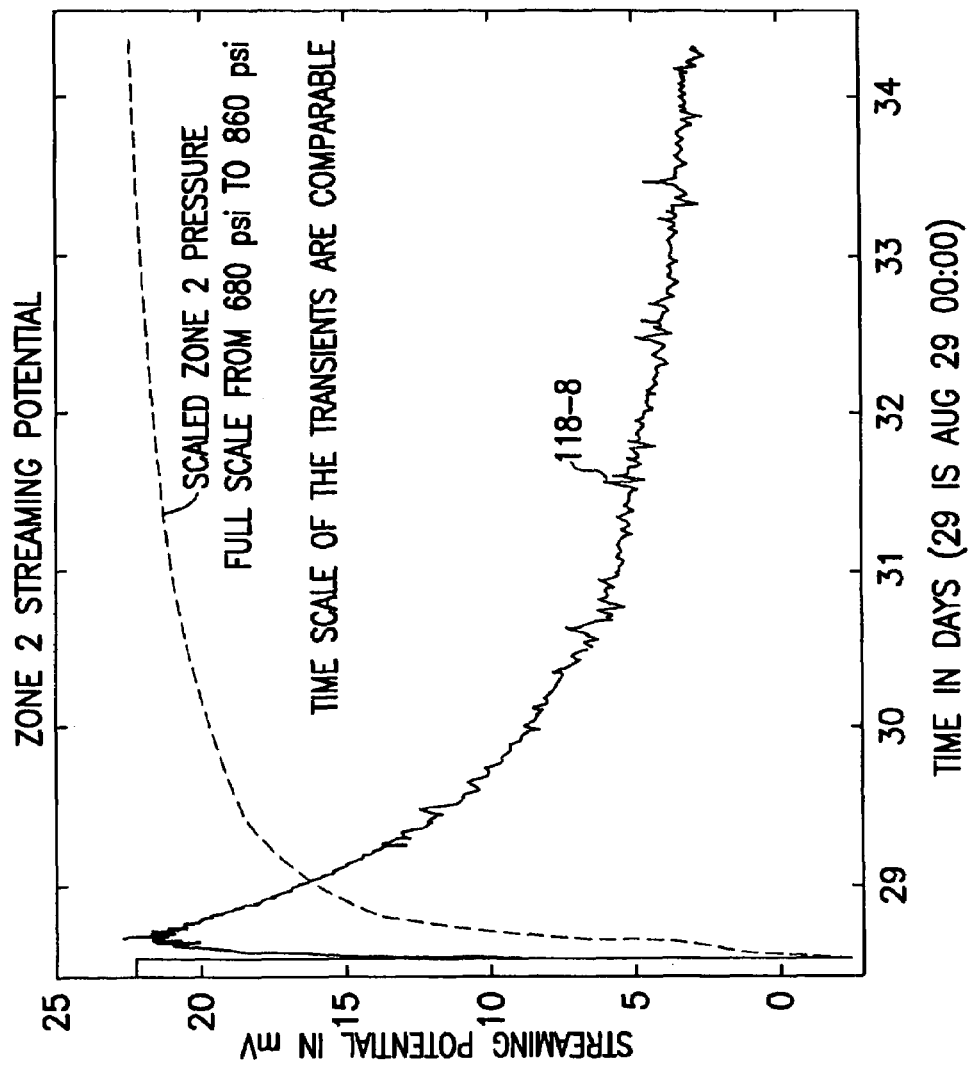
FIG. 4 is a plot showing pressure transients and streaming potentials over time for the well of FIG. 1.

It will be appreciated by those skilled in the art, that immediately after the opening of valves, the pressure gradient existed mainly in the damaged zone near the well. The permeability of the damaged zone, or skin, is known to be lower than that of the undamaged formation. If the coupling constant between the pressure gradient and the electric current is also lower in the skin than in the formation, then the streaming potential should increase with time initially when the pressure gradient diffuses from the skin to the undamaged formation. At later times, the pressure builds back to the formation pressure, the pressure gradient diminishes and diffuses deep into the formation farther away from the electrodes, and the streaming potential decreases. The rates of the initial increase and the subsequent decrease of the streaming potential are determined by the permeability of the skin, the thickness of the skin, and the permeability of the undamaged formation. The streaming potential transient recorded by electrode 118-8 in Zone 2, shown alongside with the pressure transient in FIG. 4, first rises then falls. The time scale of the fall of the streaming potential is comparable to the time scale of the buildup of the pressure, as expected.

Figure 5:
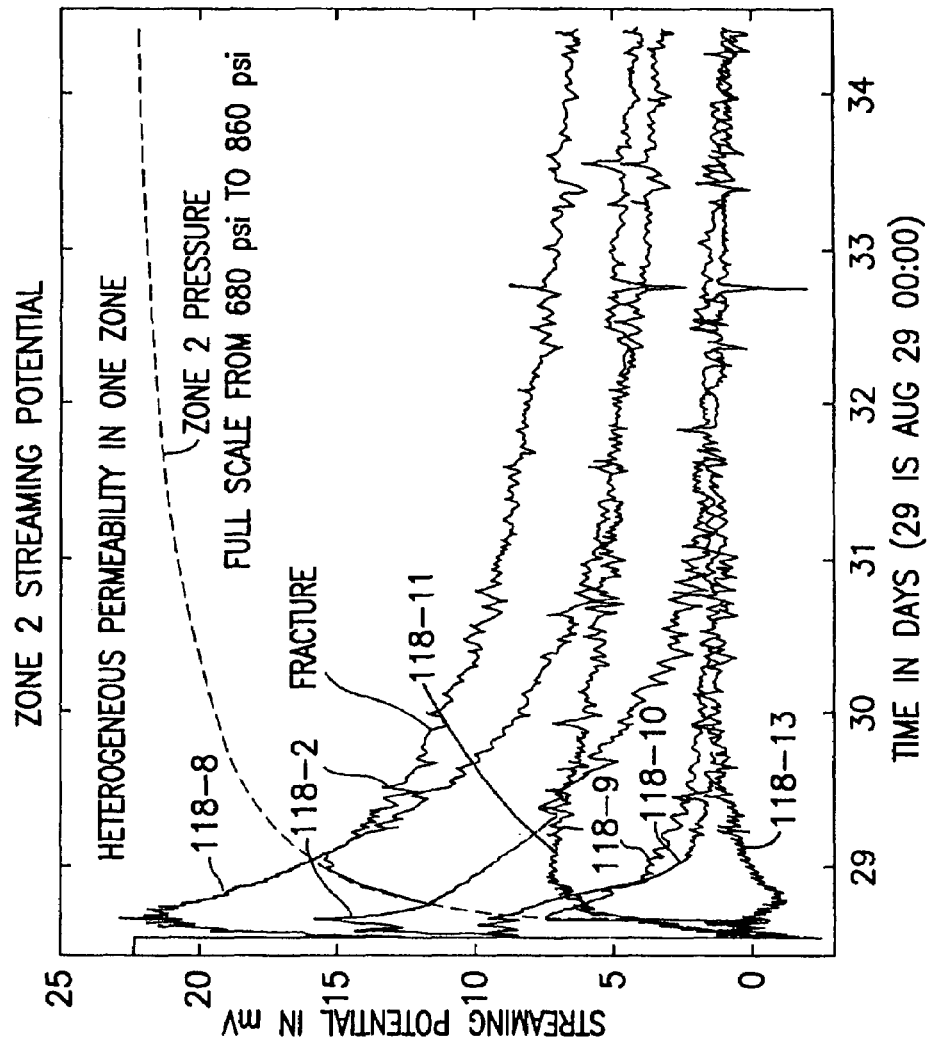
FIG. 5 is a plot showing the streaming potentials measured by electrodes in zone 2 of FIG. 1.
Figure 6:
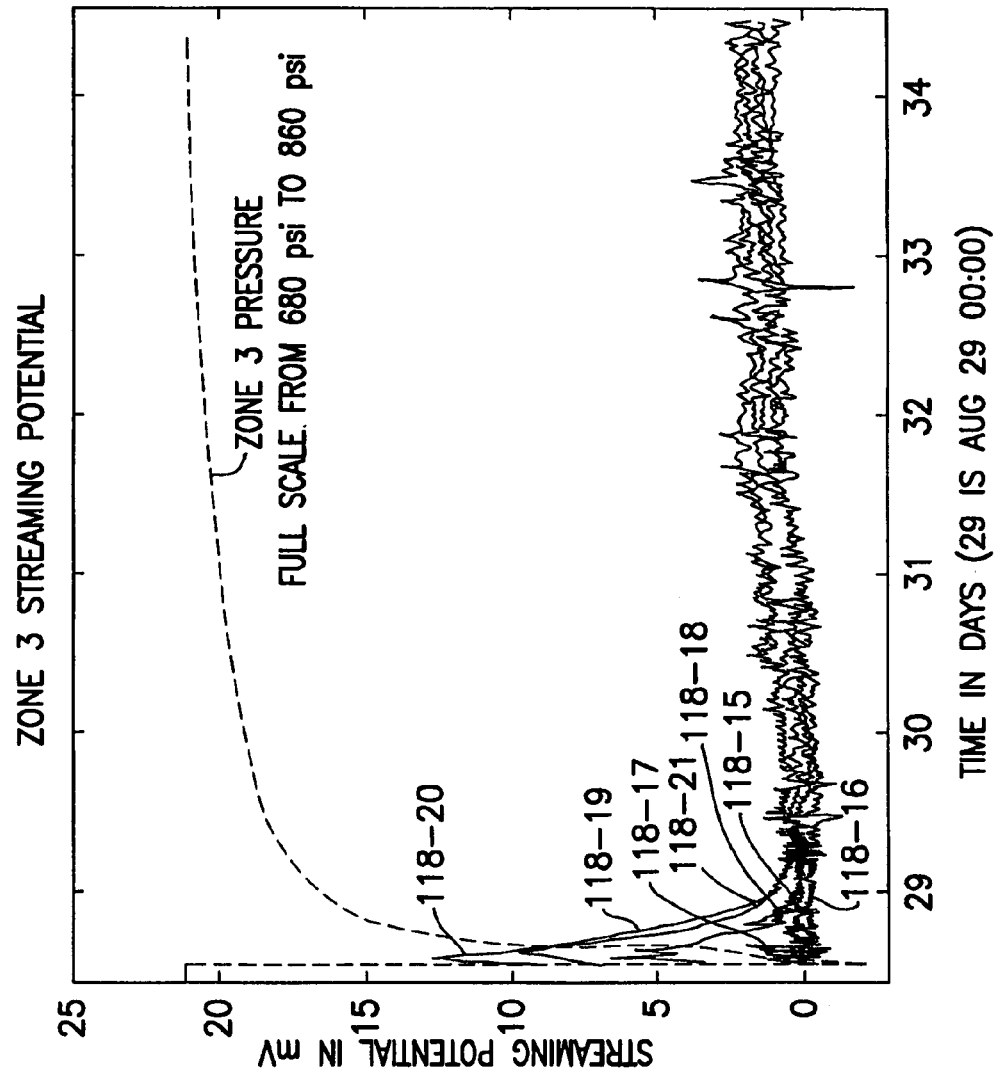
FIG. 6 is a plot showing the streaming potentials measured by electrodes in zone 3 of FIG. 1.

The Zone 2 streaming potential data recorded by all seven electrodes 118-8 through 118-14 in Zone 2 are shown alongside the pressure data in FIG. 5. The Zone 3 streaming potential data are shown in FIG. 6. The reservoir is clearly heterogeneous within each zone; individual streaming potential curves in FIG. 5 and FIG. 6 all have very different rise and decline rates, indicating large variations in permeability. Thus, it is seen that measuring streaming potential with an array of electrodes yields significantly increased information relative to the information that can be gleaned from a single pressure buildup curve for each zone which would yield only the average permeability for that zone.

Careful review of the curve from electrode 118-12 in FIG. 5 reveals a double peak. The double peak is consistent with the superimposition of a fast rising and fast falling element and a slow rising and slow falling element. The fast element arises from flow in a fracture having a high permeability, and the slow element arises from a flow in a formation matrix with low permeability. This interpretation is consistent with borehole images which were obtained from a borehole imaging tool and with modeling results discussed hereinafter.

According to the invention, the magnitude of the streaming potential is an indicator of the water fraction of flow, and it varies from electrode to electrode. As seen in FIG. 5, there is little water production near electrode 118-13 (i.e., the streaming potential remains near 0 mV), and in FIG. 6, there is no or little water production near electrodes 118-16 and 118-17.

Figure 7:
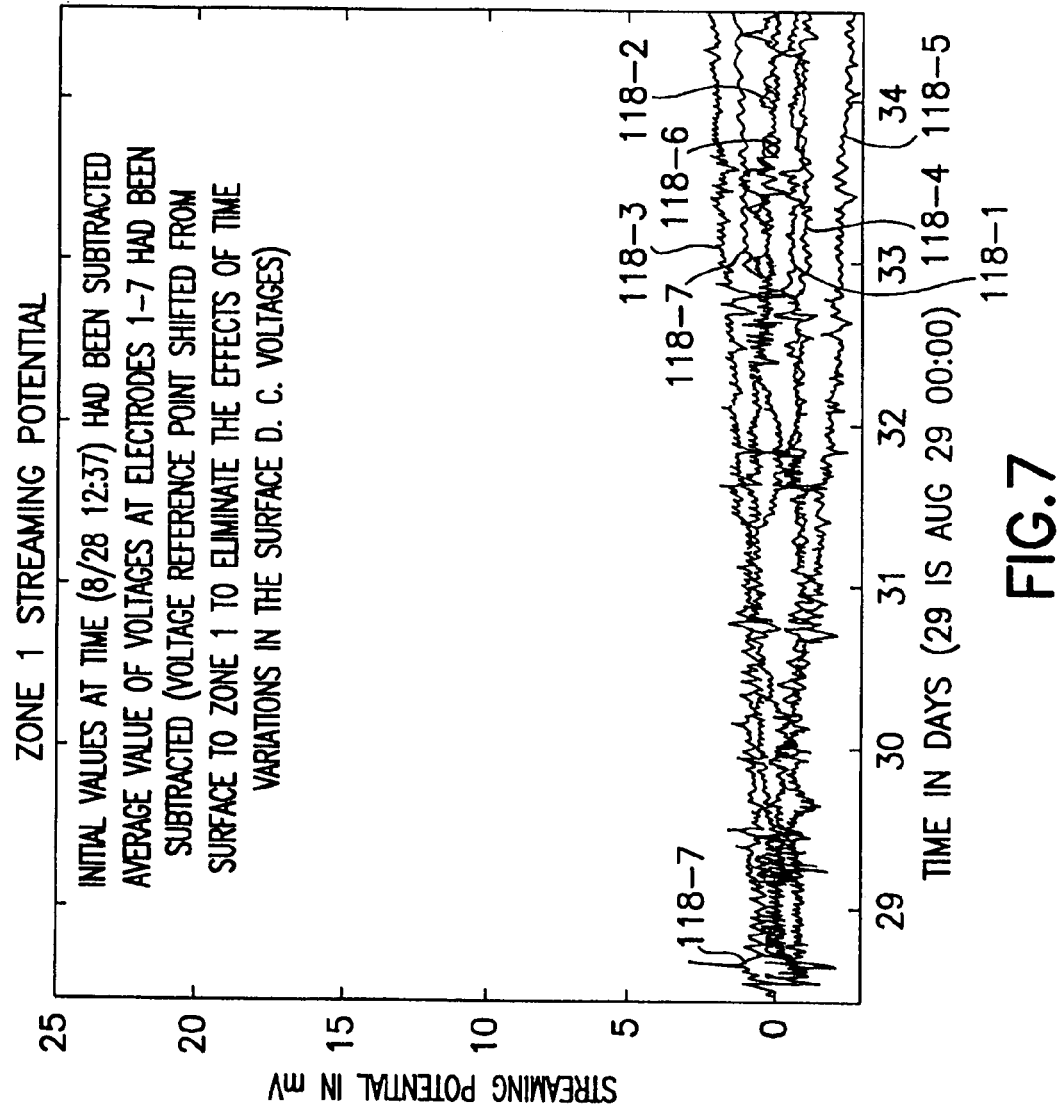
FIG. 7 is a plot showing voltage drifts of the electrodes in zone 1 of FIG. 1.

The voltages of the Zone 1 electrodes are shown in FIG. 7. Since Zone 1 is hydraulically isolated from Zone 2 and Zone 3 and the Zone 1 valve remained closed, the observed voltages were drifts in the electrodes. The drifts are of the order of less than one millivolt per day. Since the electrodes are steel centralizers exposed to the annulus fluid, drifts of such magnitude are expected.

Figure 8:
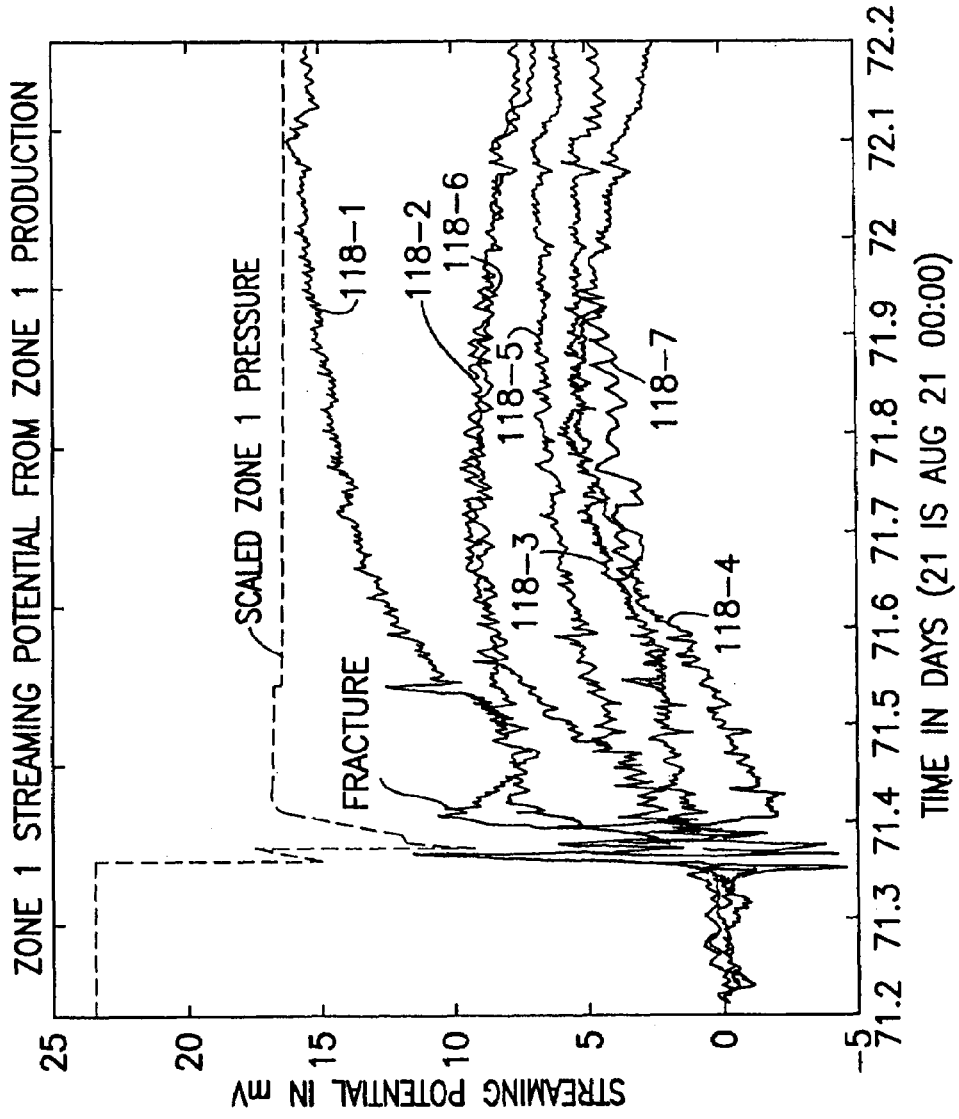
FIG. 8 is a plot showing streaming potentials measured by electrodes in zone 1 of FIG. 1.

In a later production test, Zone 2 and Zone 3 valves were shut and Zone 1 valve was opened and remained open. The pressure transient and the streaming potentials resulting from that test are shown in FIG. 8. The large streaming potential measurement and double peak associated with electrode 118-1 revealed a fracture. In addition to the fracture, the significant variations in streaming potential rise times (e.g., compare electrode 118-6 with electrode 118-5, indicated large variations in formation permeability along Zone 1.

Figure 9:
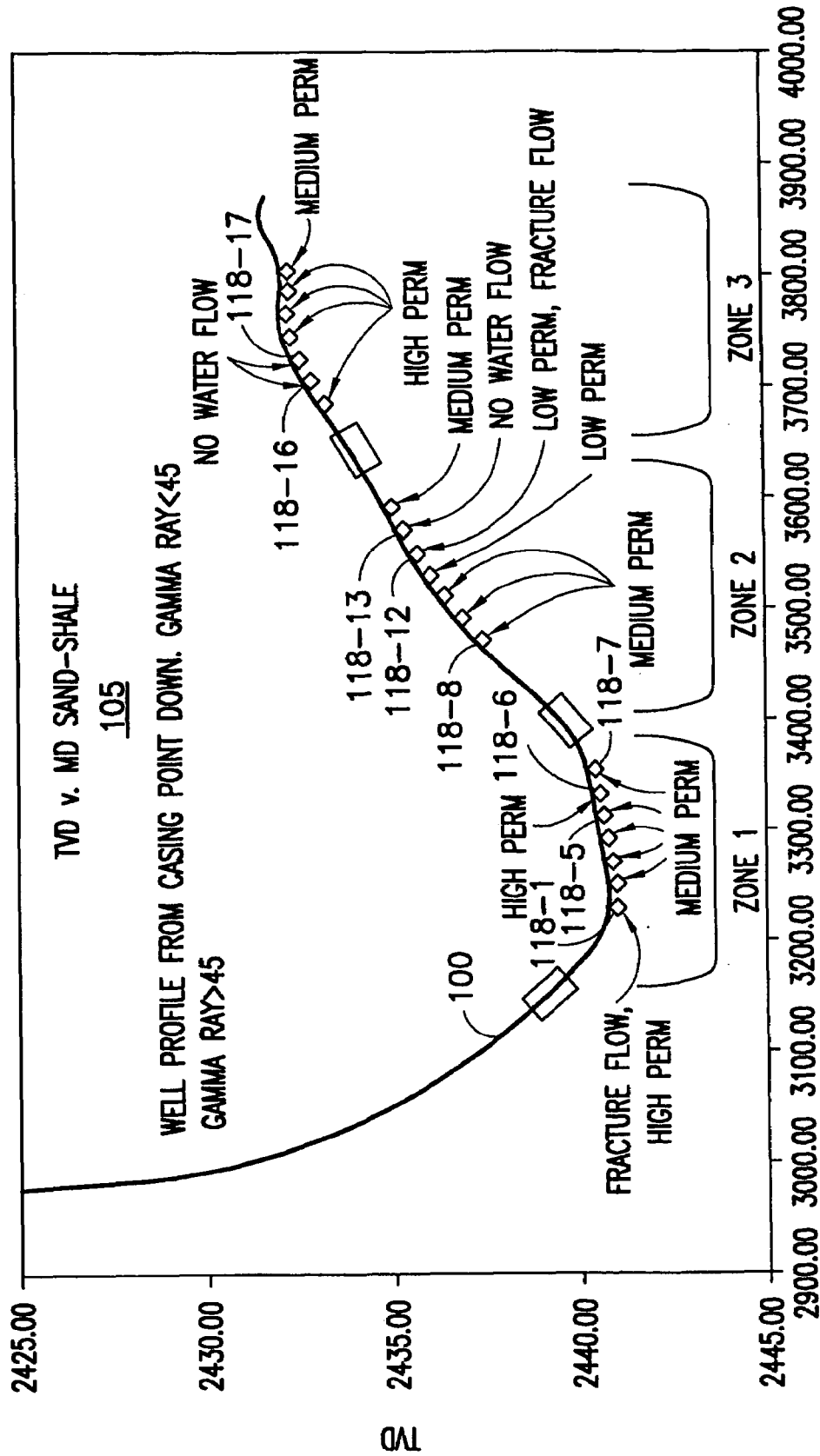
FIG. 9 is a schematic diagram of the well of FIG. 1 showing qualitative determinations made from information obtained by the electrodes disposed about the well.

Turning now to FIG. 9, qualitative interpretations of the streaming potential transient data in FIGS. 5, 6 and 8 is summarized. As seen in FIG. 9, electrode 118-1 revealed a fracture in the formation with high permeability, while electrodes 118-2 through 118-5 and electrode 118-7 indicated formation locations having medium permeability and electrode 118-6 indicated a formation location of high permeability. In Zone 2, electrodes 118-8 through 118-10 and 118-14 indicated formation locations of medium permeability, while electrodes 118-11 and 118-12 indicated a formation location or mini-zone of low permeability. In addition, electrode 118-12 revealed a fracture in the formation. Electrode 118-13 indicated a formation location with no water flow. In Zone 3, electrodes 118-15 and 118-18 through 118-20 indicated formation locations of high permeability, while electrode 118-21 indicated a formation location of medium permeability, and electrodes 118-16 and 118-17 indicated formation locations or mini-zone of no water flow. It will be appreciated by those skilled in the art that the streaming potential transient data of FIGS. 5, 6, and 8 summarized in FIG. 9 provides significantly more detailed information than what was previously obtainable by pressure transient information.

Figure 9A:
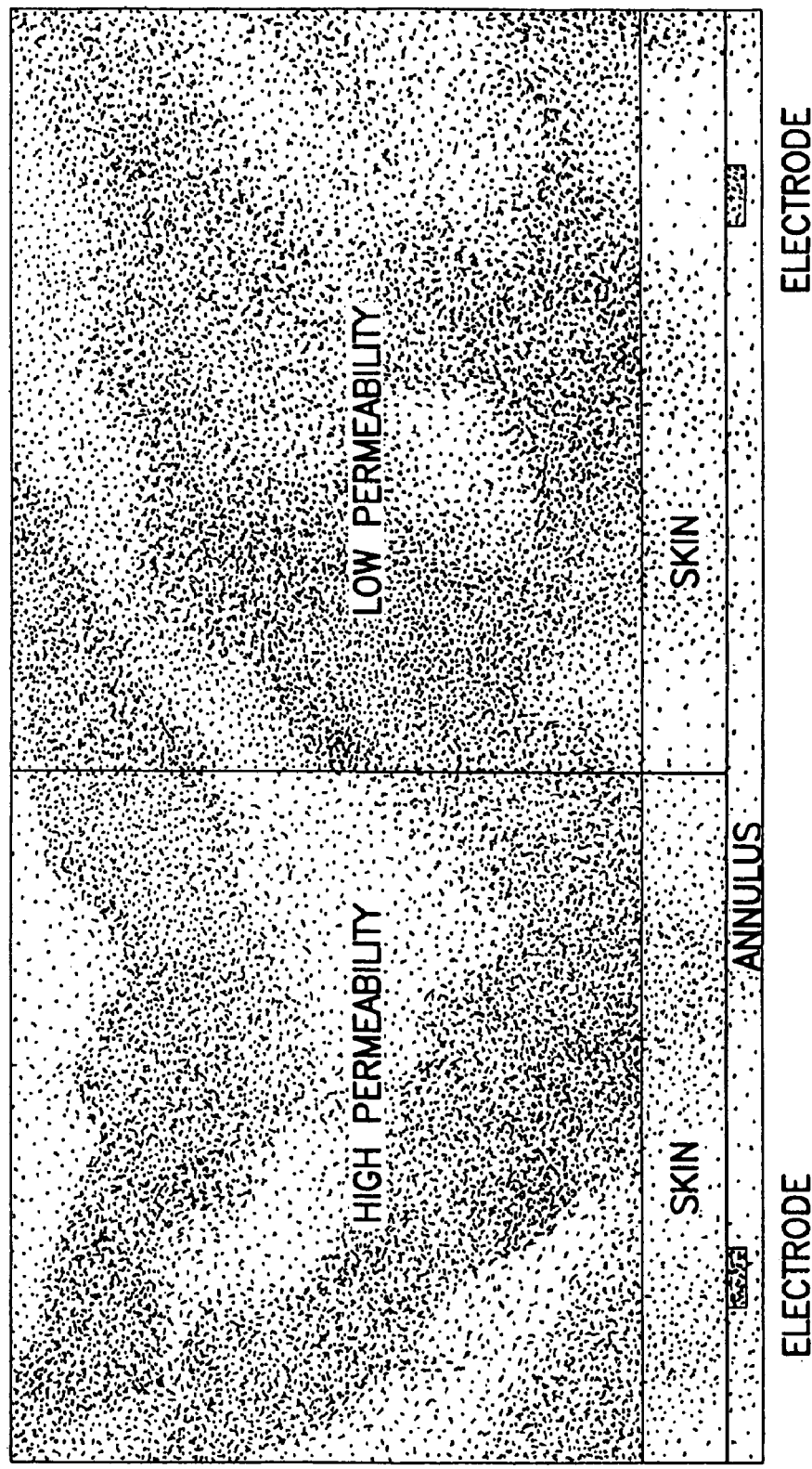
FIG. 9a is a schematic representing a forward model of a heterogeneous formation.
Figure 9B:
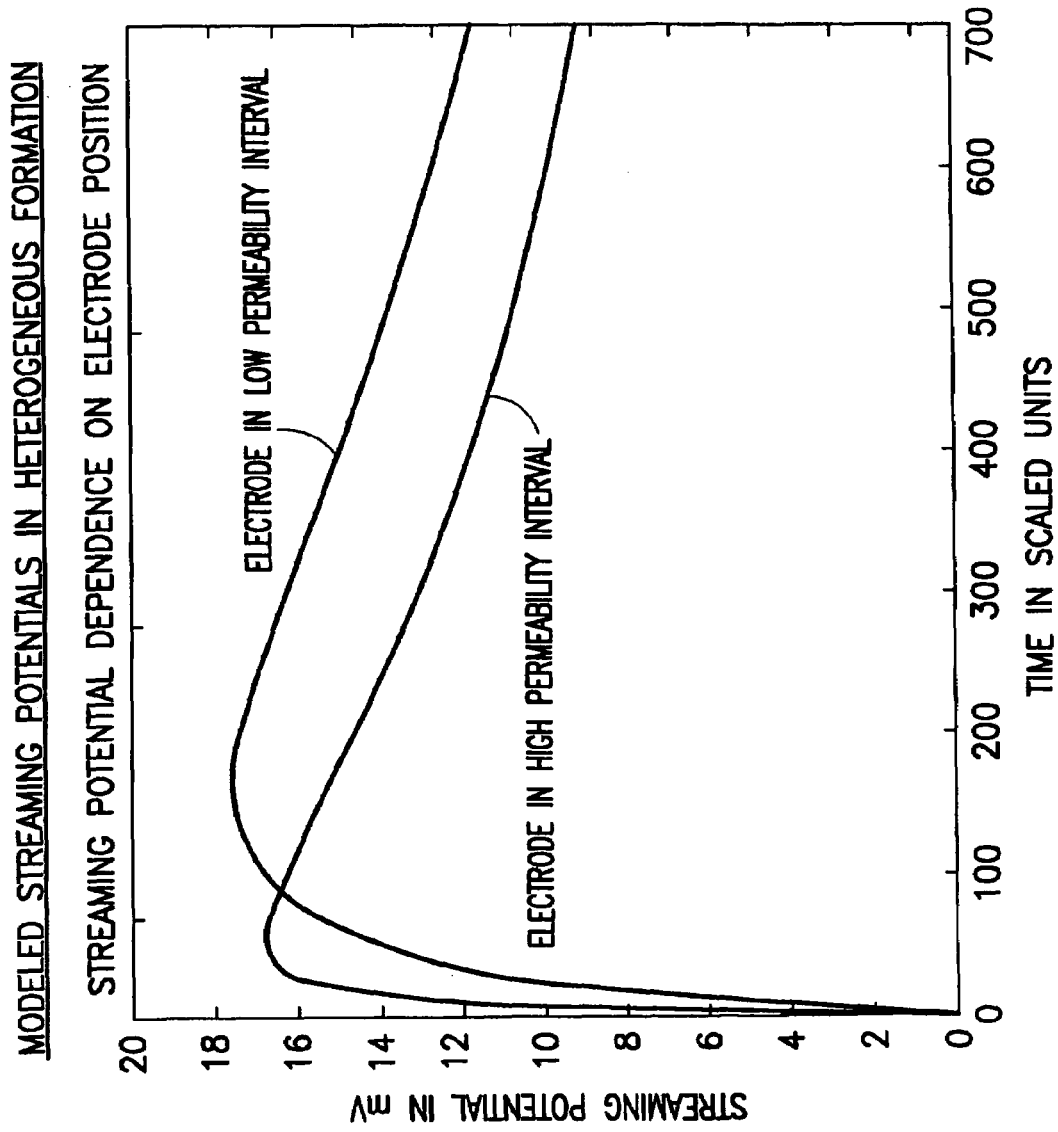
Figure 9D:
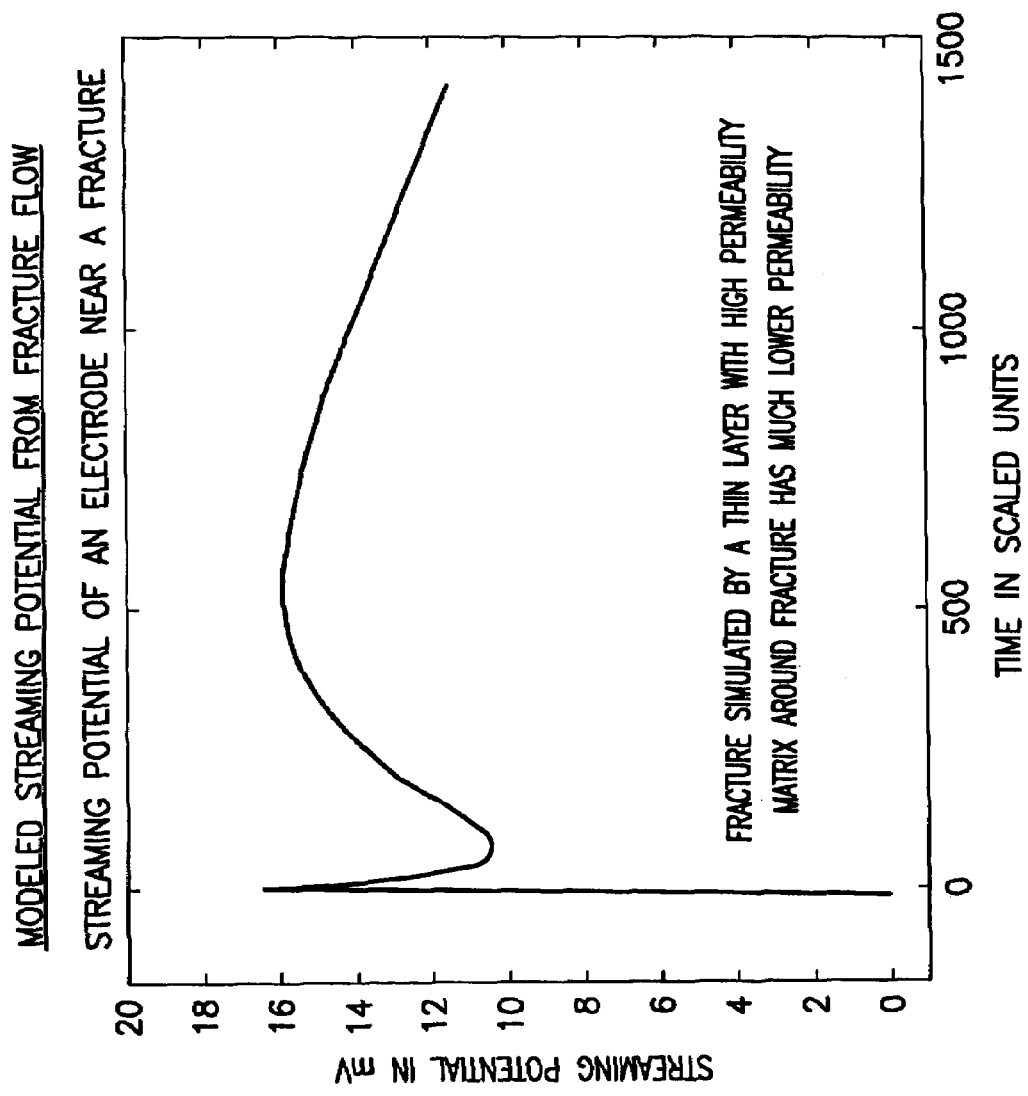
FIG. 9d is a plot of streaming potentials generated by the forward model of FIG. 9c.

The qualitative interpretations summarized in FIG. 9 are supported by forward modeling. In particular, using equation (2) for single-phase flow, the streaming potential transients are computed from a forward model of a heterogeneous formation shown graphically in FIG. 9a. The modeled response is shown in FIG. 9b. As seen in FIG. 9b, the streaming potential recorded by an electrode placed in the high permeability region rises faster and decays faster than that the streaming potential recorded by an electrode placed in the low permeability region. Qualitatively this modeled response agrees with the data presented in FIGS. 5 and 6. Similarly, in supporting the analysis related to fractures, the streaming potential transients are computed from a forward model of another heterogeneous formation shown in FIG. 9c. As seen in FIG. 9d, the streaming potential transient computed from a forward model shown graphically in FIG. 9c supports the interpretation of the streaming potential recorded by electrode 18-12 (FIG. 5); i.e., that a fracture will produce a double peaked streaming potential transient response.

In light of the above, with the streaming potential information, it is clear that an appropriate forward modeling and inversion can be carried out with a Laplace equation solver and a two-phase flow model (i.e., oil/water) as discussed above with reference to equations (9)-(11) or with a multi-phase flow model. As a result, the streaming potential transient data obtained can be used to quantify formation permeability, skin permeability, effective fracture permeability, horizontal and vertical permeabilities, communication between zones and wells, and reservoir boundaries in much greater detail than pressure transient testing alone can. As a result, a better understanding of the well and the reservoir may be obtained, leading to better management of the well and reservoir.

Figure 10:
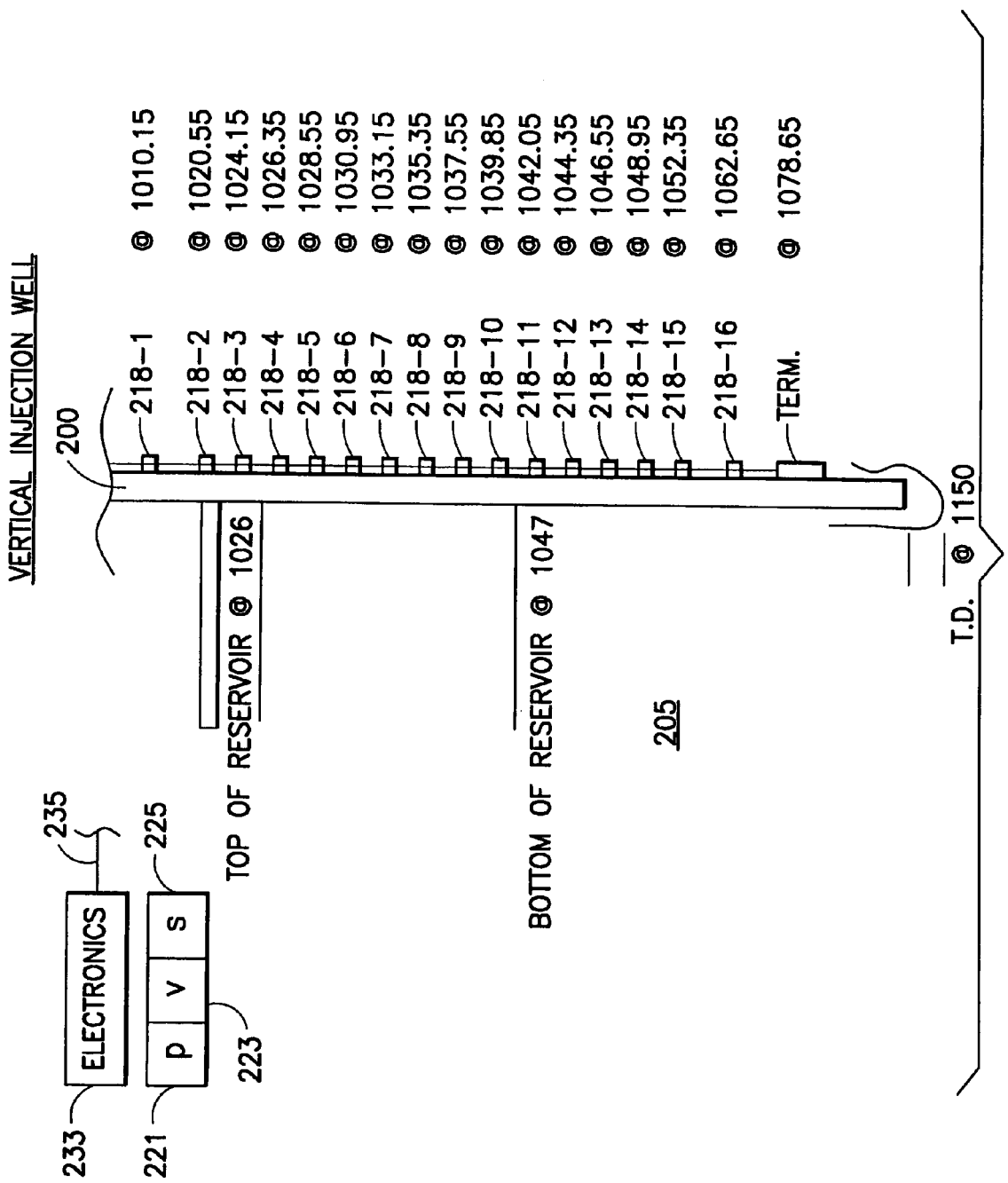
FIG. 10 is a schematic diagram of a completed vertical well having electrodes deployed thereabout for purposes of measuring streaming potentials.

Turning now to FIGS. 10-19, the use of streaming potential transient information is shown with respect to a vertical injection well 200 located in formation 205. As seen in FIG. 10, the formation 205 includes a hydrocarbon reservoir with a location identified at between 1026 ft and 1047 ft. In addition, there is a thin layer of sand at 1020.55 ft, which is hydraulically isolated from the hydrocarbon reservoir.

Figure 11:
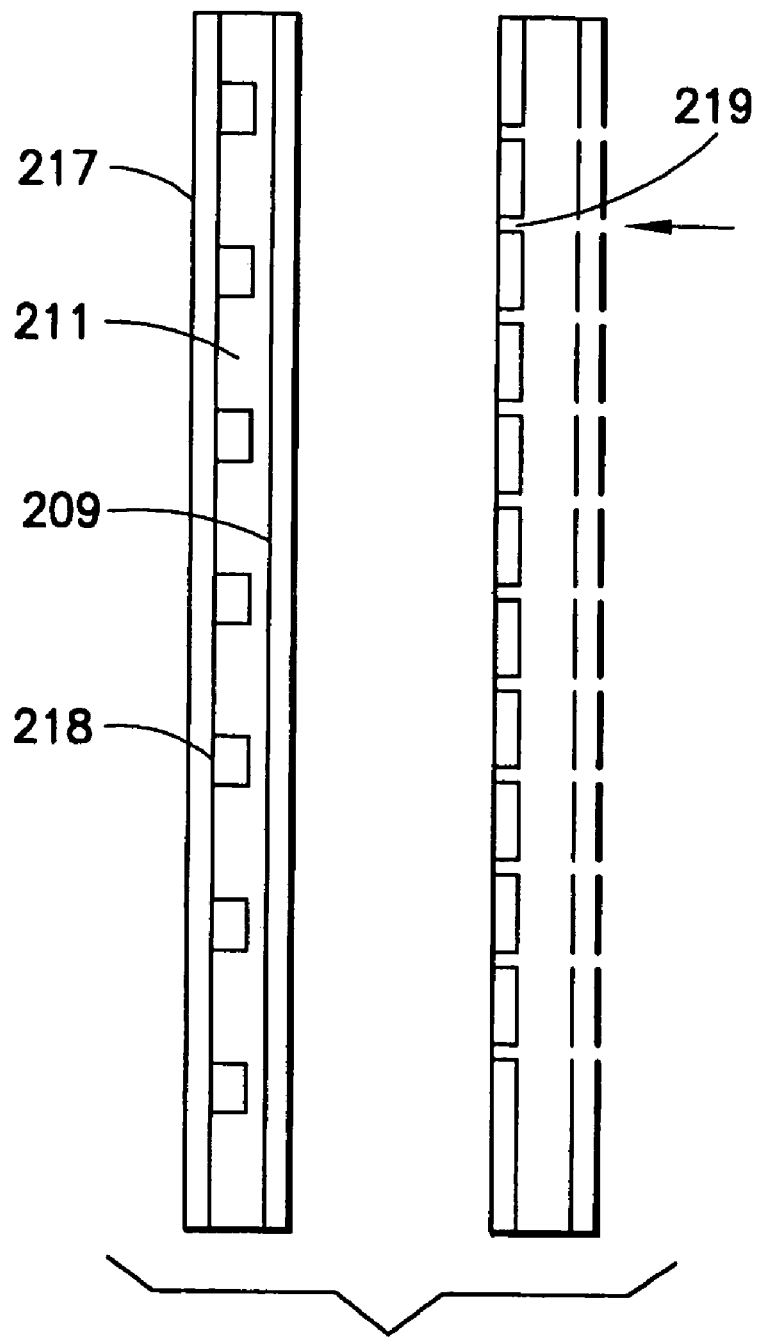
FIG. 11 is a schematic diagram of the manner in which electrodes were mounted in the completed well of FIG. 10.

As seen in FIGS. 10 and 11, the well 200 includes a casing 209 around which electrical insulation 211 is provided. An electrode array 218, including electrodes 218-1 through 218-16 with associated preferably high impedance voltage measurement circuitry, is mounted in or outside the insulation. The casing, insulation and array are cemented in place by cement layer 217. Thus, the electrodes 218-1 through 218-16 are in contact with the cement 217 but not with the metal casing 209. As shown schematically in FIG. 11, in order to produce hydrocarbons, the casing must be perforated with oriented perforations 219 so as not to damage the electrodes and the connecting cables (not shown). In this case, no perforations were made above the top of the reservoir (i.e., above 1026 ft.) After perforation, electrical current can leak through the perforation holes 219 to the metal casing 209. The electrical insulation of the casing is imperfect but functional, as is shown by field test results. The bottom electrode 218-16 in FIG. 10 was used as a reference electrode.

With well 200, streaming potential transients were created by injecting water into the well. The injection of water was controlled by a surface pump 221 and a surface valve 223 (both shown schematically in FIG. 10), and monitored by a pressure sensor 225 placed between the valve 223 and the wellhead. Initially, the injectivity of the well was too low, so the well was acidized and fractured. A cement evaluation job showed the possible existence of a poor cement bond. Therefore, the formation outside the reservoir interval of interest could be fractured, and injected water could flow into such fractures.

Figure 12:
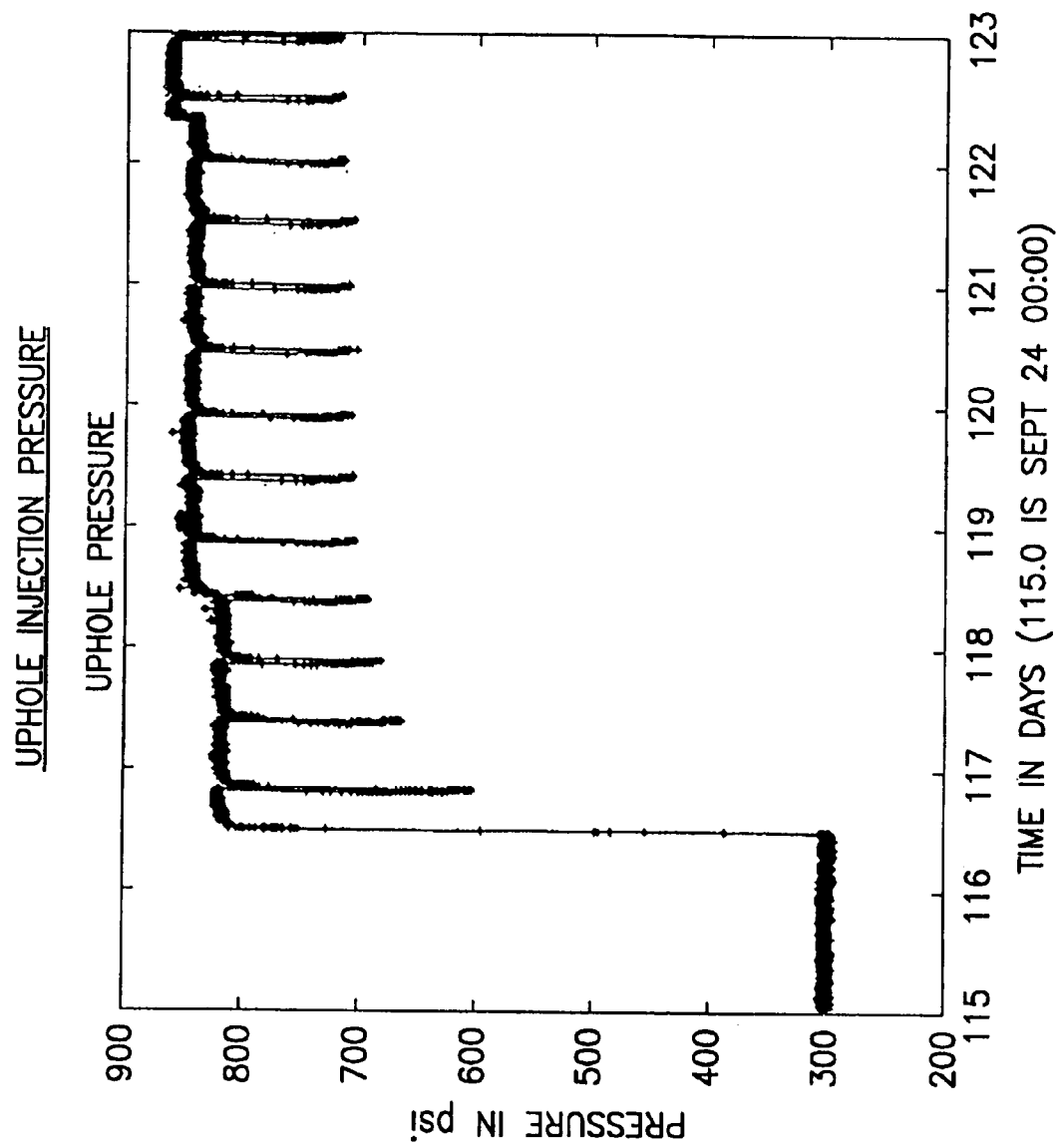
FIG. 12 is a plot of the uphole pressure applied to the well of FIG. 10 over a period of days.

The uphole injection pressure is shown in FIG. 12. Before the start of the data shown in FIG. 12, the valve had been shut for a long time. The injection pressure increased suddenly at the opening of the valve, and then periodically dropped and recovered as the pump was shut down for brief periods of time.

Figure 13:
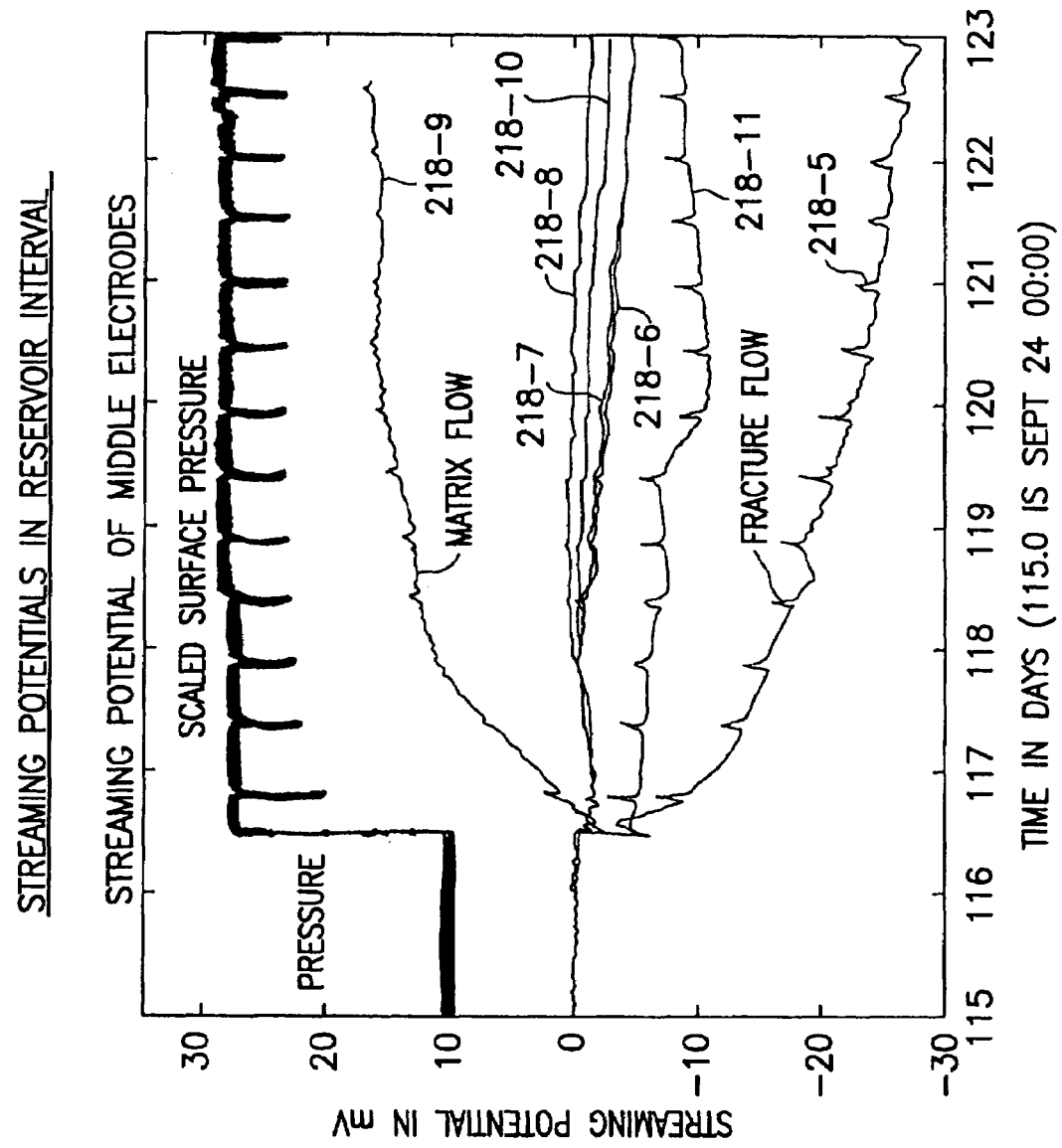
FIG. 13 is a plot showing the uphole pressure of FIG. 12 and the streaming potentials measured by a series of electrodes in a reservoir location shown in FIG. 10.
Figure 14:
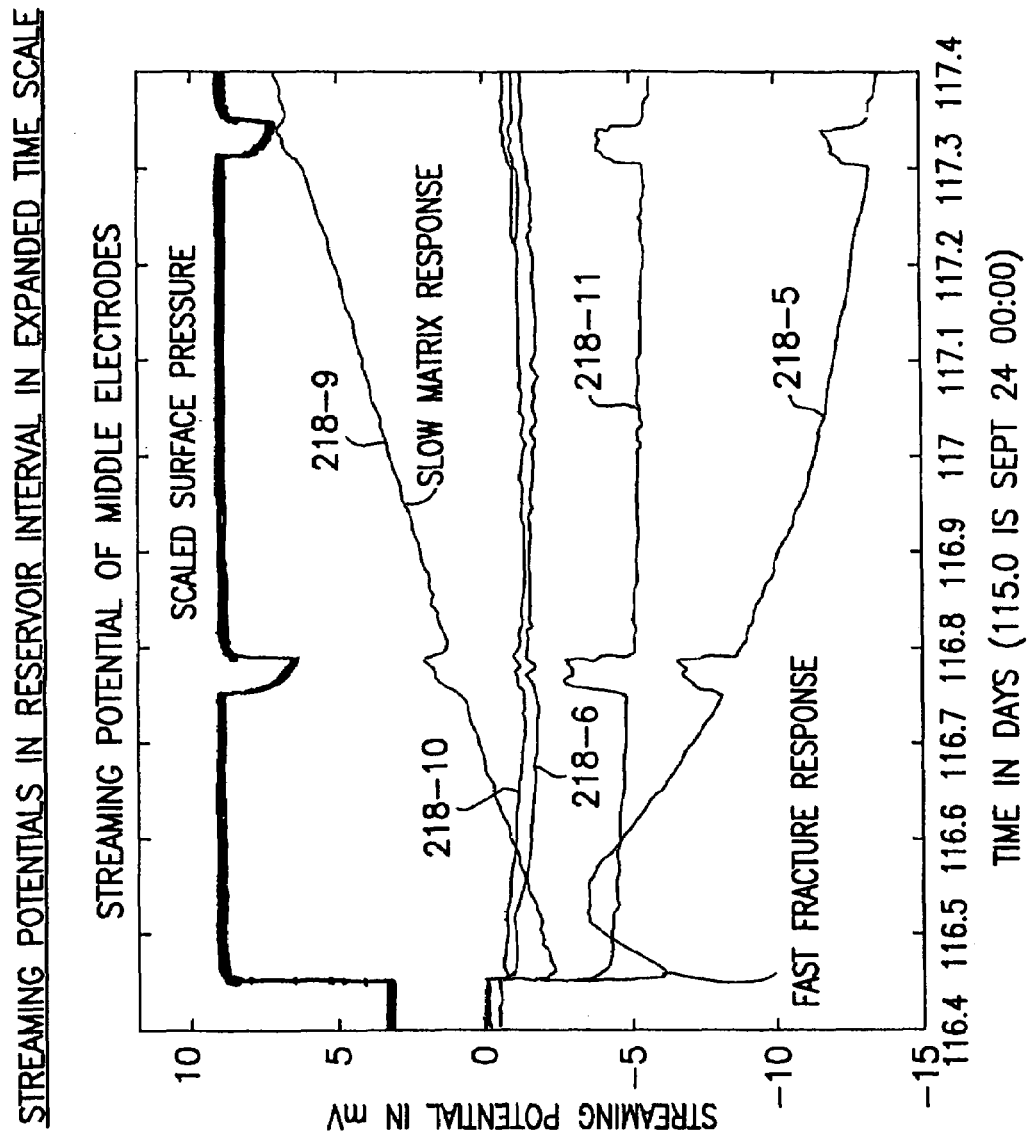
FIG. 14 is an enlarged version of a portion of FIG. 13.

The streaming potential transients sensed by the electrodes of primary interest inside the reservoir interval of interest are shown in FIG. 13 and in an expanded time scale in FIG. 14 (it being noted that electrode 218-12 failed and thus no data is shown for it). The streaming potential transients clearly have two components: one component changes very quickly in response to pressure changes, and the other component changes slowly over a period of days. The fast component relates to water flowing into fractures with high permeability. The changes in the fast component in FIGS. 13 and 14 are such that the streaming potentials decrease with increasing injection pressure and increase with decreasing injection pressure. This is expected since injection water carrying positive charges moves away from the borehole and away from the electrodes. The signs of the streaming potential of well 200 are opposite to those of the streaming potential transients shown with respect to well 100, as the data for well 100 was collected with water carrying positive charges moving into the borehole toward the electrodes during production. The slow component of the transient curve comes from water injection from the borehole directly into the rock matrix with low permeability, or from the cross-flow from the fractures into the rock matrix. The direct flow of injection water into the rock matrix is always away from the electrodes. The cross-flow from fractures into matrix is also away from the electrode if the electrode is situated directly at the fracture. The streaming potential recorded by such electrodes will decrease slowly as water moves into the matrix. If the electrode is at some distance away from the fracture, the cross-flow passes across the electrode. As a result, the streaming potential will either decrease slowly or increase slowly as water moves into the matrix, depending on the exact location of the electrode relative to the fracture. The data in FIGS. 13 and 14 can be interpreted as showing that electrode 218-5 is situated directly at a strong fracture, while electrode 218-9 is situated a little distance away from a fracture.

Figure 15:
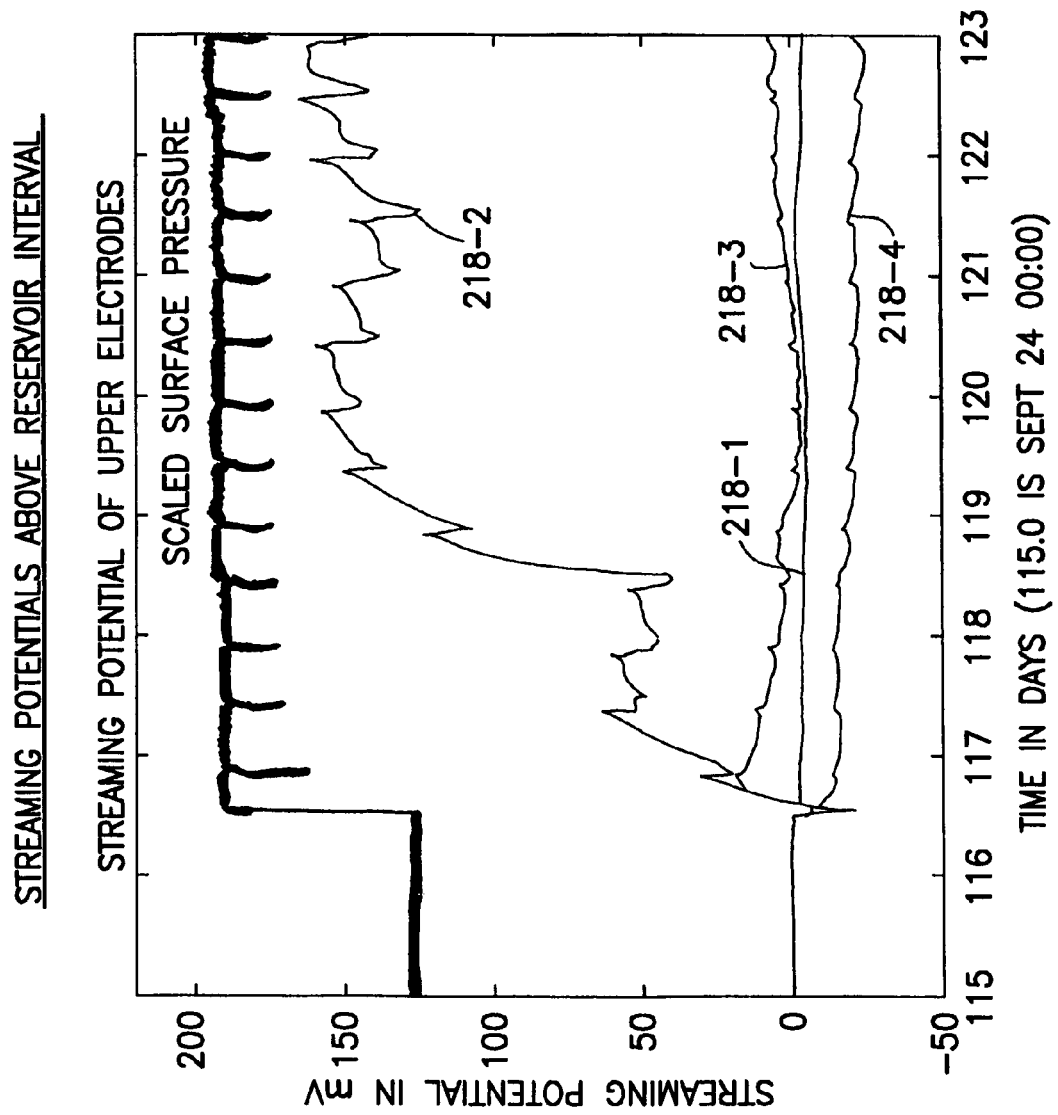
FIG. 15 is a plot showing the uphole pressure of FIG. 12 and the streaming potentials measured by a group of electrodes above the reservoir location.
Figure 16:
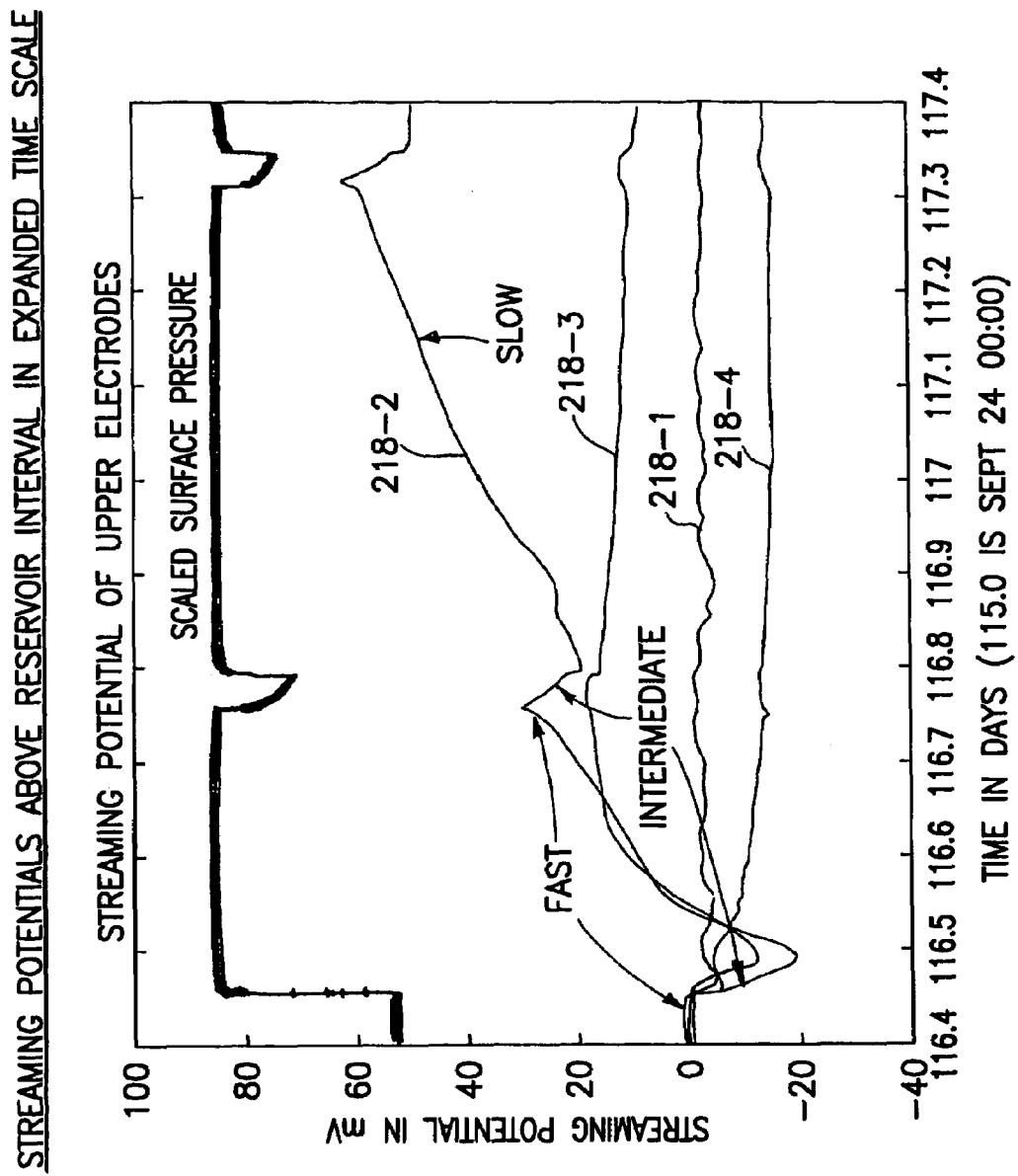
FIG. 16 is an enlarged version of a portion of FIG. 15.

The streaming potential transients sensed by the electrodes above the reservoir interval of interest are shown in FIG. 15 and in an expanded time scale in FIG. 16. Electrode 218-2 is located very close to the thin permeable sand adjacent a non-perforated portion of the casing. Yet, the streaming potential of electrode 218-2 reached a value of 150 mV, which is five times higher than the streaming potentials recorded by any electrode in the reservoir interval. This may be explained by understanding that the interval above the perforated interval had been fractured, presumably from a cement annulus (which was confirmed by the cement evaluation job). Thus, the shapes of the streaming potential transients in this interval are different from those in the reservoir interval. In this interval, the streaming potential appears to be comprised of three components: fast, medium, and slow. This is seen more clearly with respect to electrode 218-2 in FIG. 16. A shale layer located between the reservoir and the thin sand layer is probably fractured. Flow through the fractures in the shale layer has a time scale in between the flow time scales of the sand and matrix.

Figure 17:
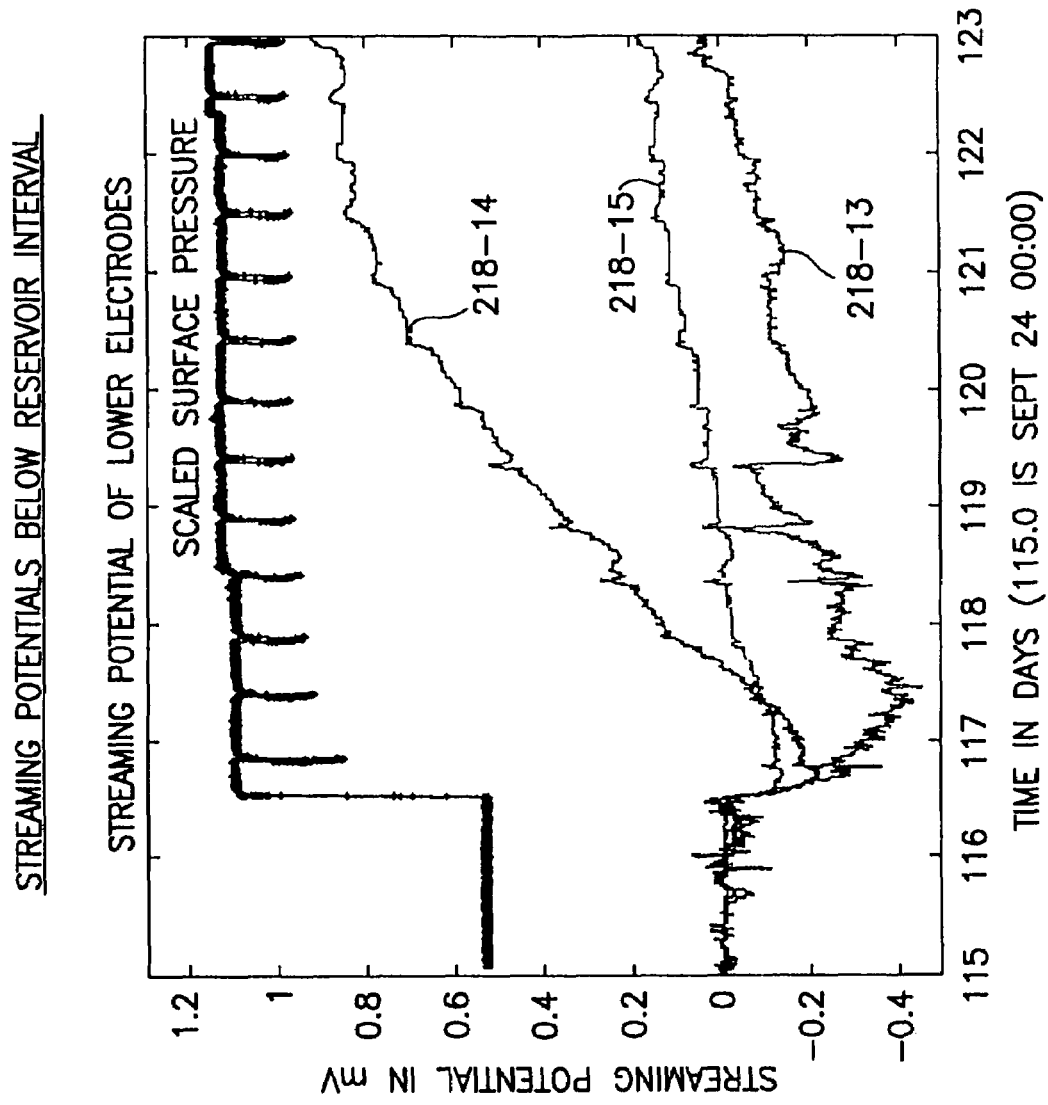
FIG. 17 is a plot showing the uphole pressure of FIG. 12 and the streaming potentials measured by a group of electrodes below the reservoir location.

Turning now to FIG. 17, the streaming potentials sensed by the electrodes 218-13 through 218-15 below the reservoir are seen. The voltages sensed by these electrodes are less than 1 millivolt. Thus, it can be concluded that there is very little injection water flowing below the reservoir interval.

Figure 18:
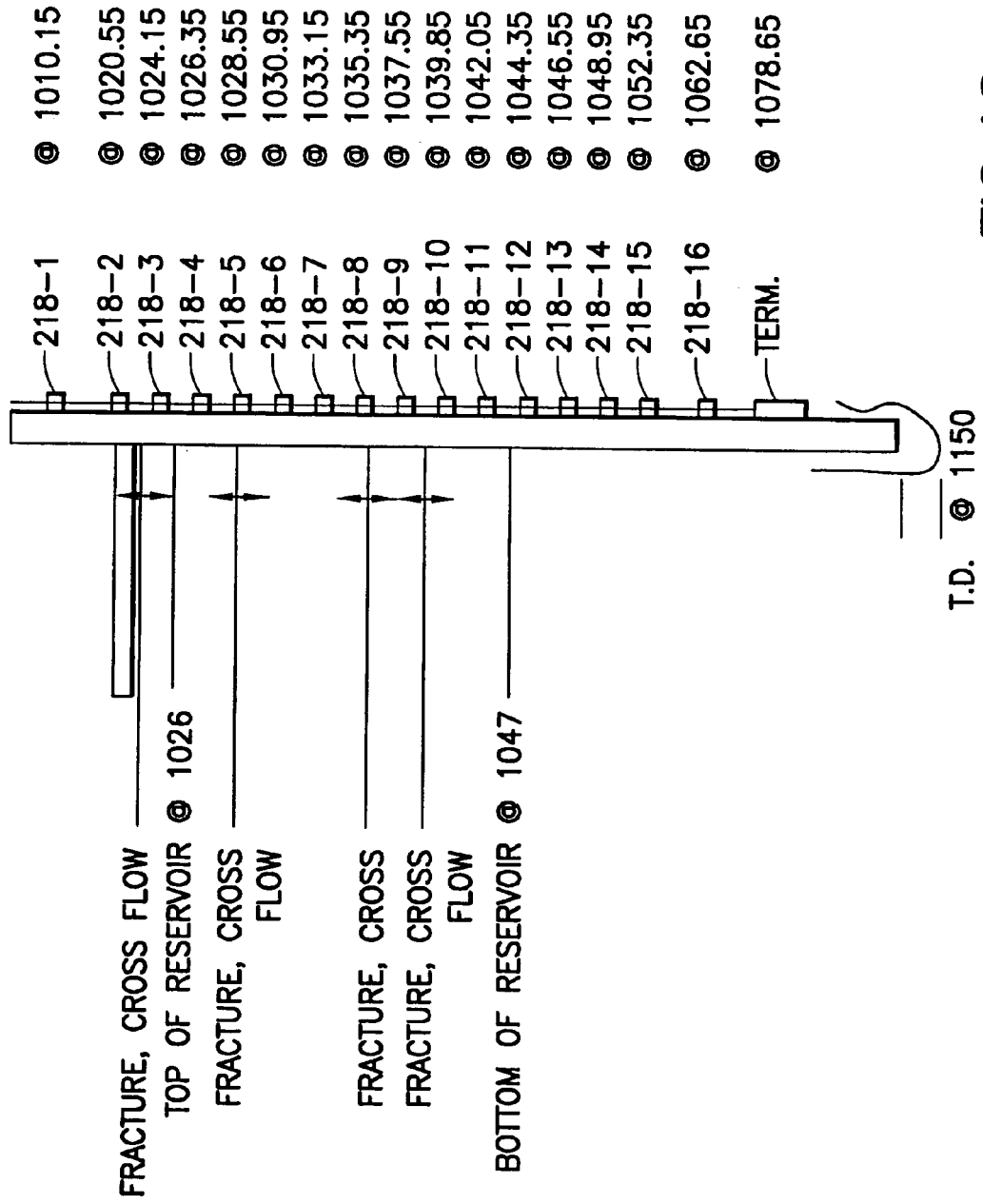
FIG. 18 is a schematic diagram of the well of FIG. 10 showing qualitative determinations made from information obtained by the electrodes disposed about the well.

Given the measurements made by the electrodes as shown in FIGS. 13-17, a qualitative interpretation of the streaming potential transient data may be made and summarized as shown in FIG. 18. In particular, as seen in FIG. 18, a fracture with cross-flow exists through a shale layer atop the reservoir; a fracture with cross-flow exists at 1028.55 feet (electrode #4); a fracture with cross-flow exists near 1037.55 feet (electrode #9); and a fracture with cross-flow exists at 1042.05 feet (electrode #11) (see FIG. 13).

Figure 18A:
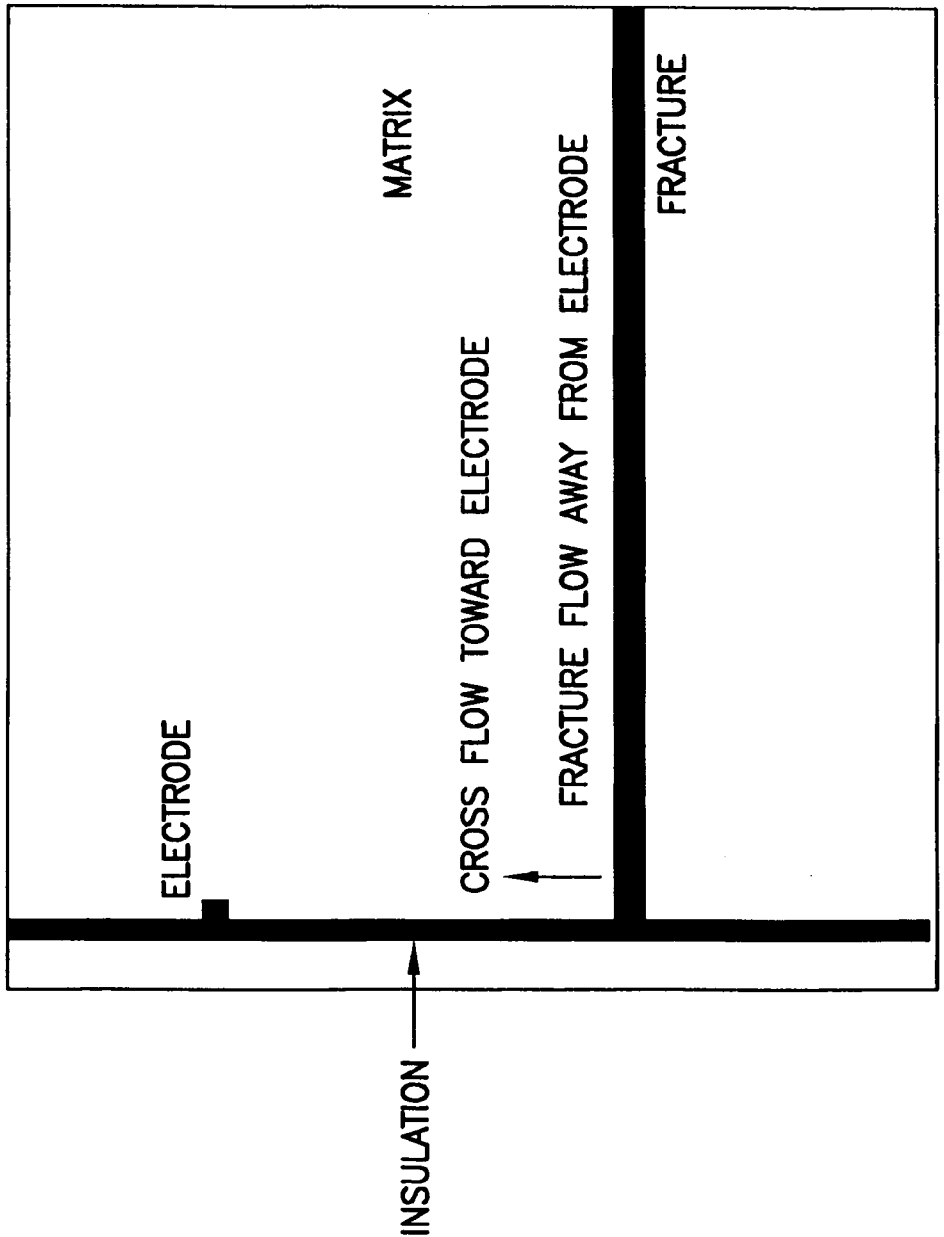
FIG. 18a is a schematic representing a forward model of a vertical producing well having a fracture.
Figure 18B:
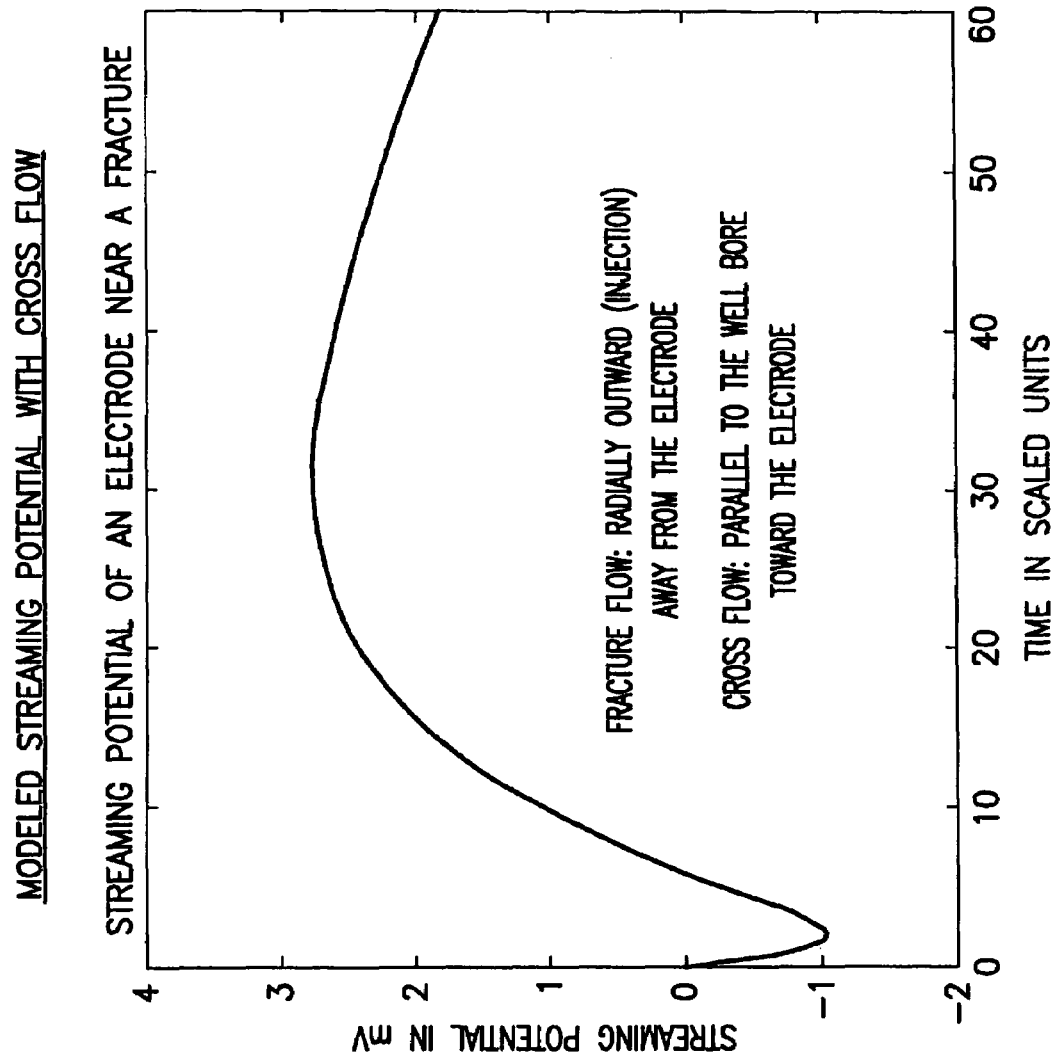

The qualitative interpretation of FIG. 18 is supported by the forward model shown graphically in FIG. 18a and the modeled response shown in FIG. 18b which show that the streaming potential from cross flows can either have the same sign or the opposite sign to that of the fracture flow. Thus, qualitatively the modeled response successfully reproduced the observed data of electrode 218-9 of FIG. 13 and electrode 218-2 of FIG. 15.

Figure 19:
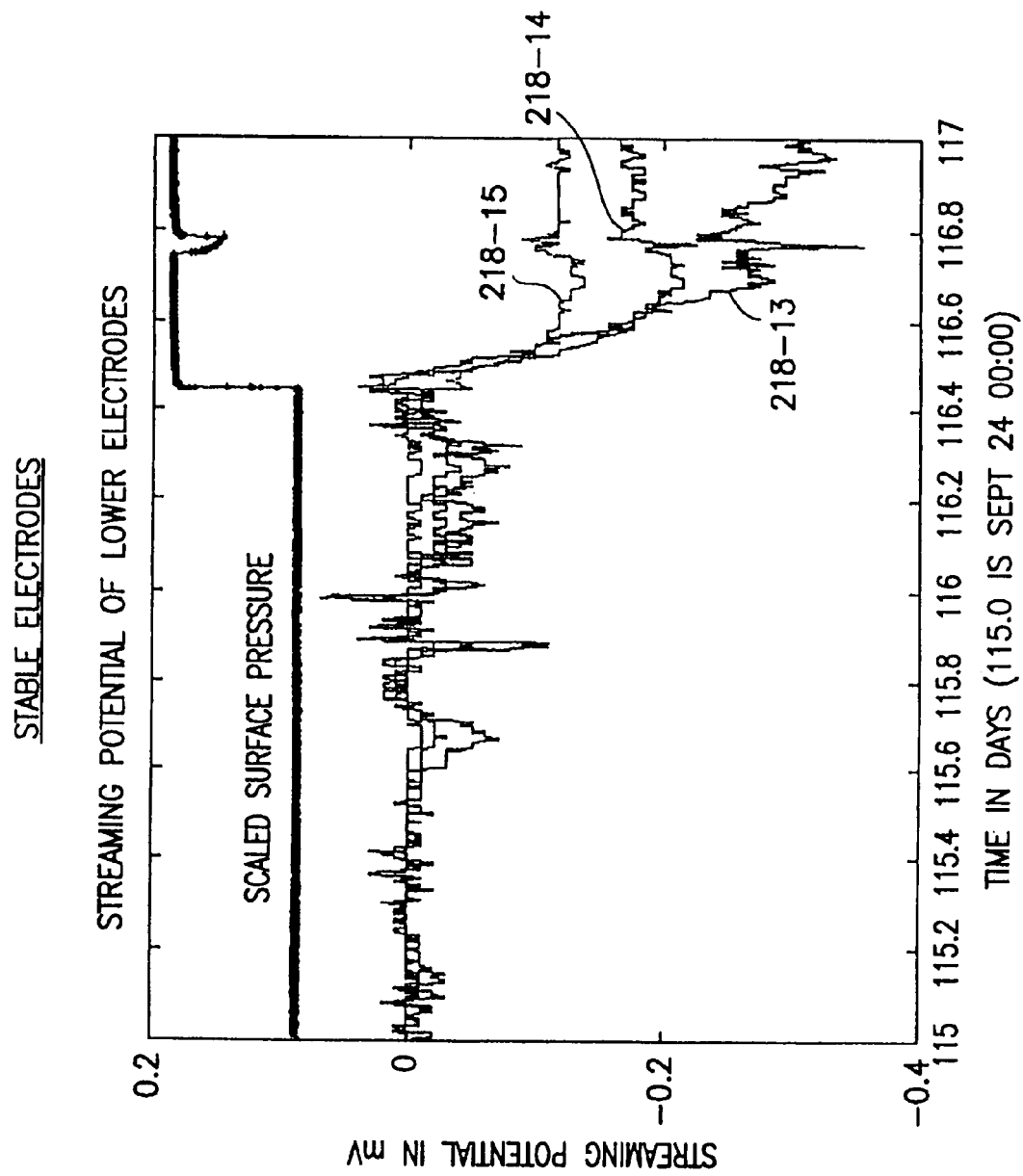
FIG. 19 is an enlarged version of a portion of FIG. 17 which is used to show the stability of the electrodes.

The streaming potential data of electrodes 218-13 through 218-15 shown in FIG. 17 are shown in expanded time and voltage scales in FIG. 19. Before the surface valve 223 was turn on at day/time 116.43, the voltages of electrodes 218-14 and 218-15 were stable to one digitization level (i.e., to 10 microvolts). Electrode 218-13 voltage had some noise spikes up to 100 microvolts. The noise spikes happened at a very short time scale, were unrelated to the surface stabilities of the electrodes, and were likely due to noise picked up on the wire 235 connecting the electrode and the surface electronics 233 (FIG. 10). These noise spikes can be lessened or eliminated by better wiring and electronics, or by downhole electronics.

As seen in FIG. 19, the voltages of electrodes 218-13 through 218-15 correlated very well with the uphole pressure data. At the opening of the valve 223 at 116.43, all three voltages decreased, and when the pump 221 stopped momentarily near day/time 116.8, all three voltages showed a small but visible peak. The correlation is very similar to those observed in the much larger voltages measured by electrodes located in the reservoir and in the interval atop the reservoir. Based on this information, it can be concluded that the electrode stability for the cemented electrodes is of the order of 10 micro-volts and signal levels of 100 micro-volts are adequate to determine reservoir properties of interest. The stability of the cemented electrode array 218 is at least one hundred times better than the exposed centralizer electrodes 118 shown with reference to well 100.

According to another aspect of the invention, the electrodes of the electrode array utilized to sense and measure streaming potential transients are preferably covered or coated with a semi-porous covering material (such as cement), whether utilized as centralizers as shown with reference to a sand-screen completion or in other permanent installations, or when used in MWD or wireline applications as discussed hereinafter. The semi-porous covering material should have a significant electrical conductivity but a very low permeability so that ions can reach the electrode to enable voltage measurements, but no new fluid reaches the electrode surface during the time period of measurement. The surfaces of the electrodes are in a stable chemical environment, which gives rise to measurement stability. A presently preferred semi-porous material is cement, although a semi-porous ceramic, clay, or other material could be utilized. As an alternative, liquid junction electrodes can be utilized, as the semi-porous plug of a liquid junction electrode stops fluid movement but allows ionic diffusion. A stable electrode allows the measurement of a transient over a longer period of time, thereby permitting an analysis deeper into the formation, and also permitting measurements at weaker signal levels.

With the streaming potential measurements described with reference to FIGS. 10-19, it will be appreciated that determinations can be made of the formation (matrix) permeabilities and the effective fracture permeabilities along the well utilizing equations (9) through (11) as discussed above and by considering fractures as a thin medium with given permeability. In addition, the streaming potential measurements can be utilized to obtain real time monitoring of fracturing jobs. For example, when well 200 was fractured, the target was the middle reservoir interval of interest, and the fracturing of the upper interval was not desired. However, the injected water did not go where it was desired. Had the streaming potential data been acquired during the fracturing procedure, it would have been observed at a very early time that the fracturing fluid was moving mainly toward the upper interval (above the reservoir). The fracture job could then have been stopped, a cement squeeze job applied, and the fracture plan properly executed.

Figure 20:
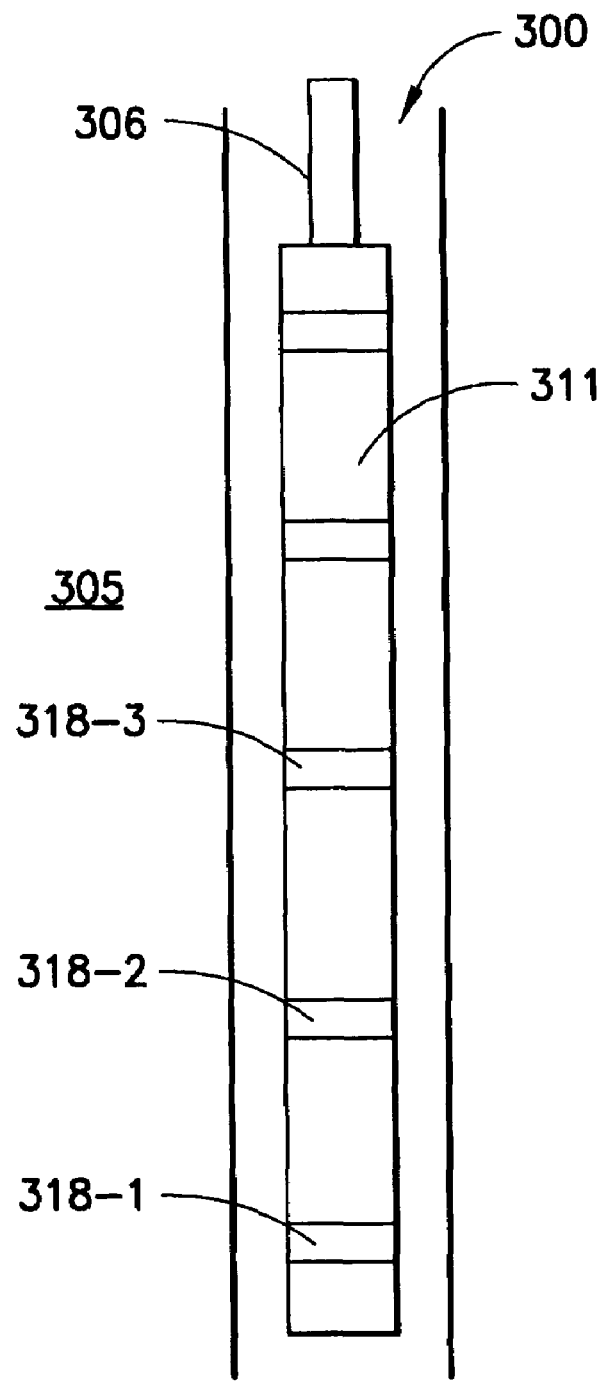
FIG. 20 is a schematic diagram of an open hole completion with electrodes located about an insulated zone surrounding a tubing.

Turning now to FIG. 20, a formation 305 is seen traversed by an open hole completed well 300 having a tubing 306 extending therein. An insulated sonde 311 is shown around the tubing with electrodes 318-1, 318-2 . . . disposed on the insulated sonde 311. Thus, the tubing 306 is essentially just a conveyance means for moving the sonde 311 to desired locations. Other conveyance means, which are preferably relatively solid, but somewhat flexible, could be utilized. Those skilled in the art will appreciate that wires connecting the electrodes, measuring electronics, and telemetry or data storage, which are standard in the art, are provided in, on, or with the sonde 311 and electrodes 318 but are not shown in FIG. 20.

Figure 21:
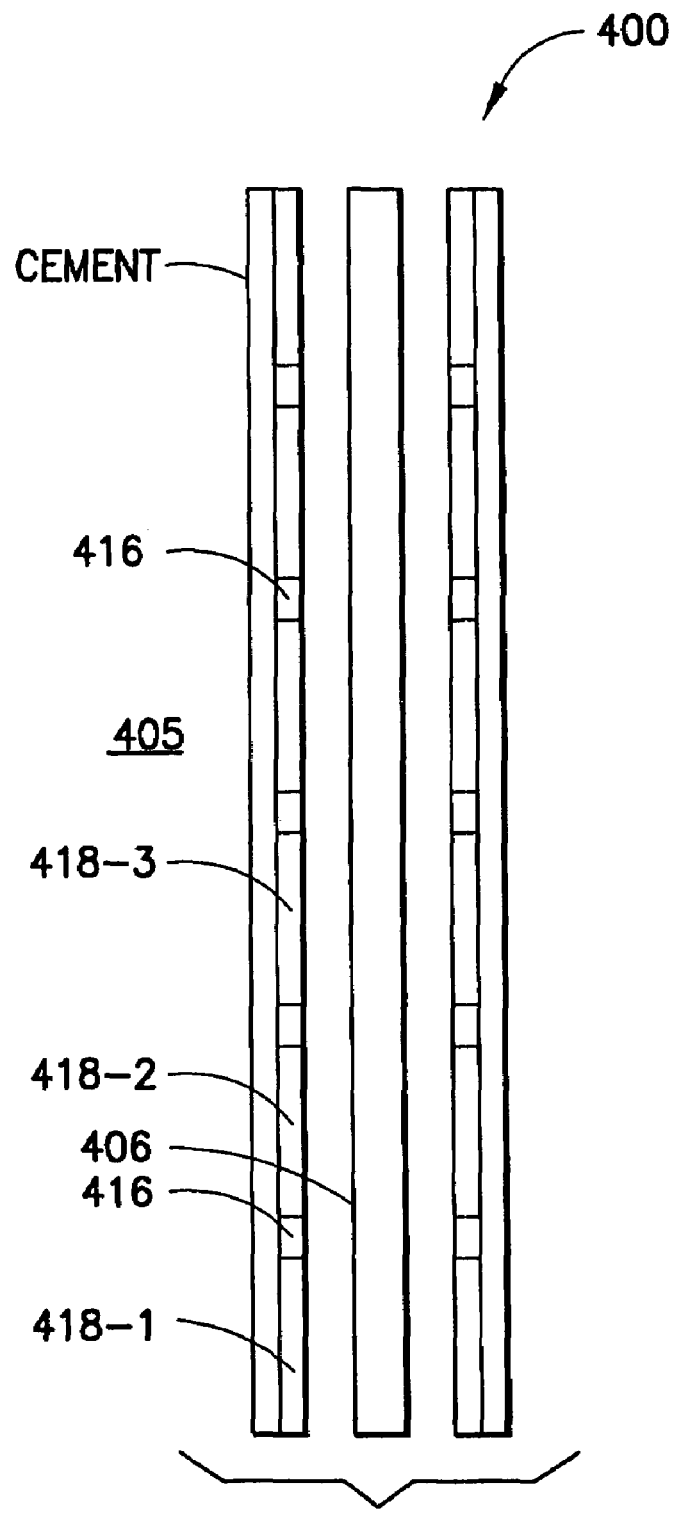
FIG. 21 is a schematic diagram of a cased-hole completion with electrodes incorporated into the casing.

A cased hole completion is shown in FIG. 21, with a formation 405 traversed by a well 400. The well includes an insulated tubing 406, and a casing having conductive electrode portions 418-1, 418-2, 418-3, . . . separated by electrically insulated portions 416 which are cemented into the well by cement 417. Thus, the metal casing serves as an electrode array with individual sections of the casing electrically isolated from one another. The casing sections may be regular casing sections connected by isolation joints, or specially designed casing sections made of two or more electrically isolated subsections. As seen in FIG. 21, the electrodes 418 are in contact with the cement 417 and with the fluid inside the casing. If the tubing 406 inside the well is metallic, the tubing is preferably electrically insulated or partially insulated.

According to another embodiment of the invention, a tool and method for measuring streaming potentials while drilling a borehole is provided. In particular, during drilling, a pressure difference between the formation and the borehole creates mud invasion and pressure transients, and thus, streaming potential transients. In wells drilled with an oil-based mud, a streaming potential will exist if the mud contains a water fraction.

Figure 22:
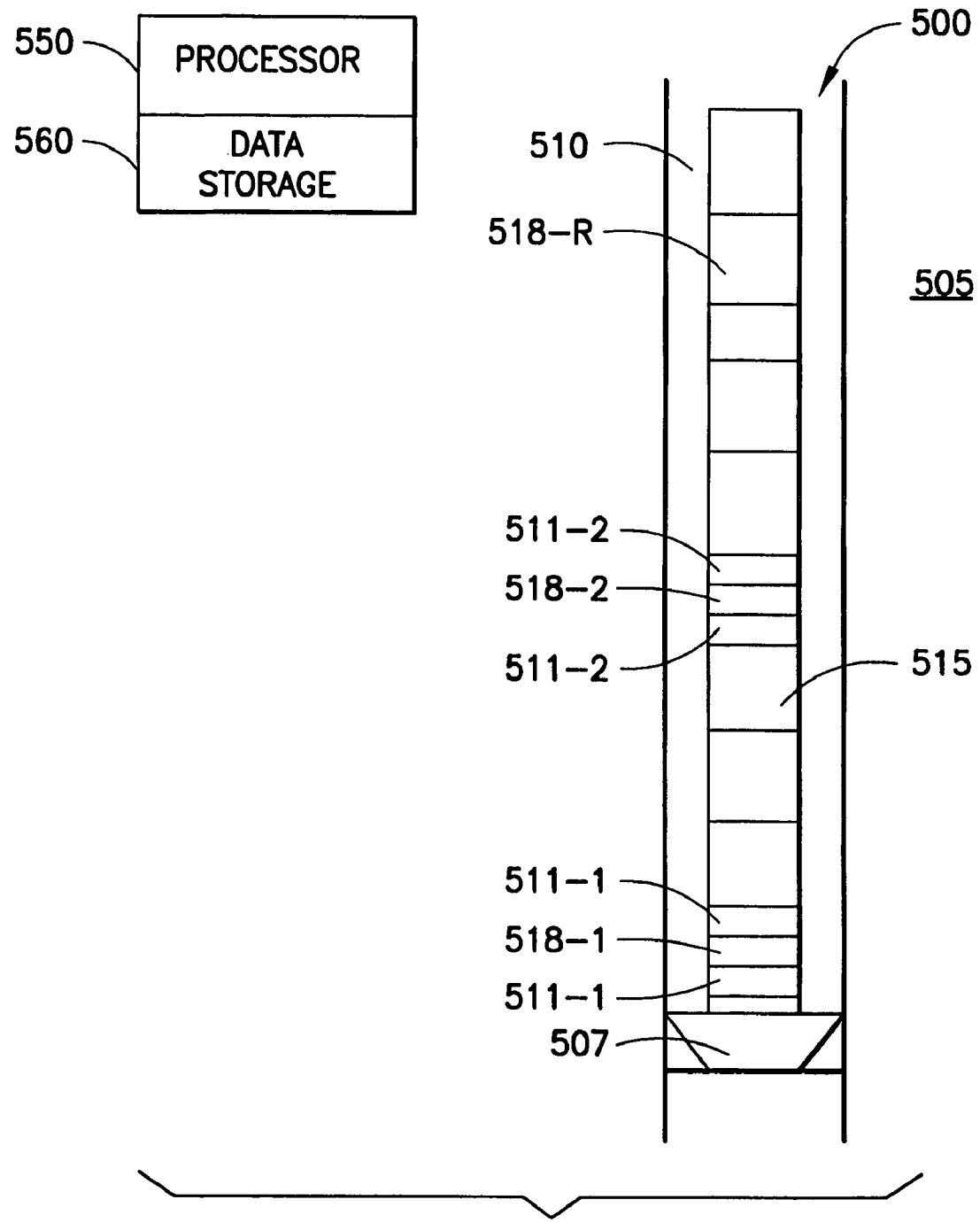
FIG. 22 is a schematic diagram of an LWD tool with streaming potential electrodes disposed thereon.

Turning now to FIG. 22, a schematic design of an while-drilling streaming potential tool 510 is shown in borehole 500 surrounded by formation 505. Drilling tool 510 includes a drill bit 507 and electrodes 518-1, 518-2, 518-3 . . . , 518-R (all preferably coated with a semi-porous covering such as cement) mounted on electrically insulated sections 511-1, 511-2, 511-3 of the drill pipe 515. The electrodes 518 move with the tool 510. Thus, different electrodes in the array will sense at different points in time the streaming potential transient at a fixed spatial point. The spacing between the electrodes 518 in the array and the drilling speed determines the temporal sampling rate of the streaming potential transient. In other words, the time at which electrode 518-2 is located at a particular previously measured by electrode 518-1 is dependent upon both the drilling speed and the distance between the electrodes. In the embodiment of FIG. 22, the top electrode 518-R is used as the voltage reference electrode, as it is farthest from the drill bit and will often arrive at locations in the formation when the streaming potential transient has already reached steady state values. Those skilled in the art will appreciate that wires connecting the electrodes, measuring electronics, and telemetry, which are standard in the art, are provided in, on, or with the LWD tool 510 but are not shown in FIG. 22. A processor 550 and associated data storage 560 are shown which are used to obtain answer products are shown in FIG. 22. It will be appreciated that the processor 550 and data storage 560 are applicable to the other embodiments as well, although the processor may utilize different forward and inverse models.

With the while-drilling tool 510, the streaming potential measurements made are passive voltage measurements, which can be made in a highly resistive borehole by using high impedance electronics. In wells drilled with oil-based mud, the electrodes need to be as large as possible and placed as close as possible to the formation to reduce electrode impedance.

It will be appreciated by those skilled in the art that in order to properly analyze the data obtained by the LWD tool 510, a model of mudcake built up during drilling should be included in the forward model. Accurate models such as disclosed in E. J. Fordham and H. K. J. Ladva, "Crossflow Filtration of Bentonite Suspensions", Physico-Chemical Hydrodynamics, 11(4), 411-439 (1989) can be utilized.

Given the while-drilling tool 510 and an appropriate model, the streaming potential information obtained by the tool and processed can yield various answer products. Since the streaming potential transients created by drilling will change rapidly with time for a formation with high permeability and slowly for formation with low permeability, with an inversion model that contains the mudcake built-up model, formation permeability of the invaded zone and the uninvaded zone can be obtained.

With the LWD tool 510 and an appropriate model, a system for early detection of drilling fluid loss may be implemented. In particular, there may be sudden fluid loss from natural or induced fractures during drilling. In that case, streaming potential will rise instantaneously as fluids rush into the formation. The changes in borehole pressure will be somewhat slower, since the borehole has a storage capacity. Noticeable fluid loss at the surface will happen much later. For drilling induced fractures, large changes in the streaming potential will be detectable long before the fractures becomes serious. Therefore, monitoring of the streaming potential measurements can be used for early detection of fluid loss.

Likewise, the streaming potential information can be utilized for the early detection of abnormal formation pressures. For example, if the formation pressure becomes higher than the borehole pressure, the signs of the streaming potential will reverse. This reversal of sign will be observable before sufficient amount of fluid has flowed into the borehole for the pressure kick to be observable. The build-up of the flow reversal may happen over a short but finite period of time as the abnormal pressure zone is being drilled. Any reversal of flow will be immediately observable in the streaming potential measurements. Therefore, streaming potential measurements have value in the early detection of abnormal formation pressure.

Figure 23:
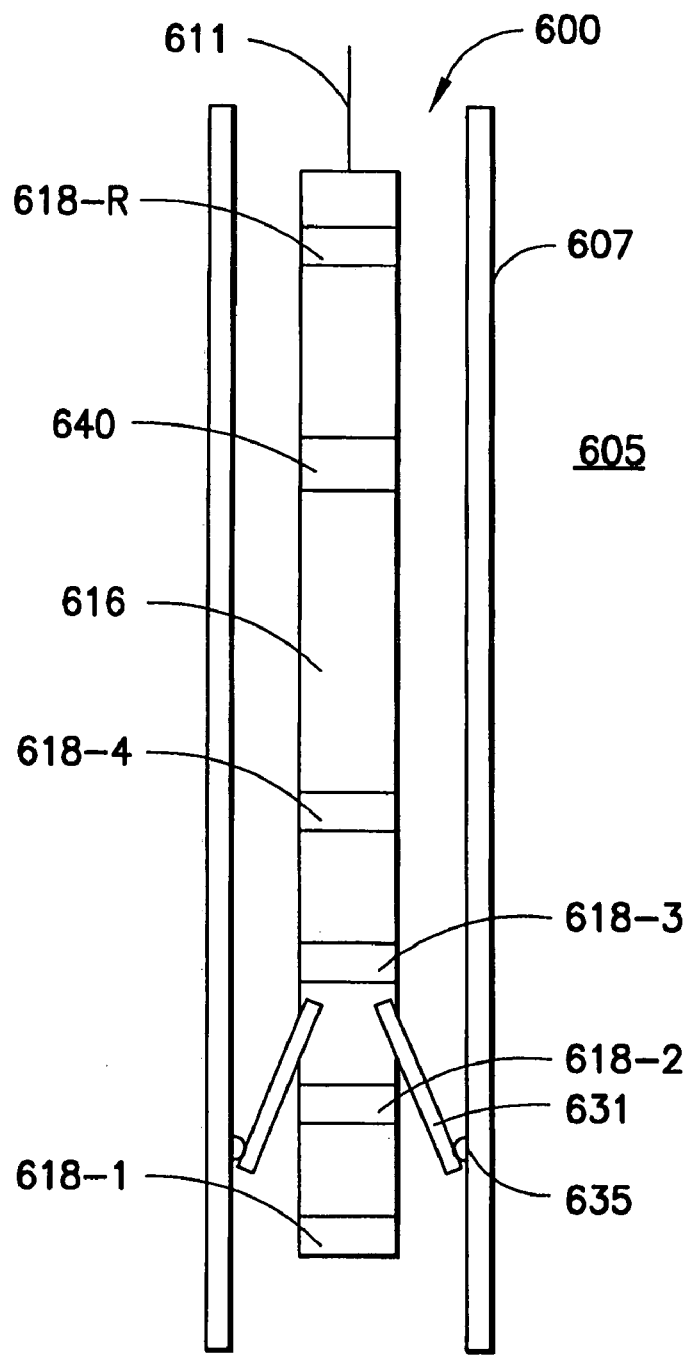
FIG. 23 is a schematic diagram of a wireline tool having streaming potential electrodes disposed thereon.

Turning now to FIG. 23, another embodiment of the invention is seen. In FIG. 23, a wireline streaming potential tool 610 is provided. The wireline tool 610 is shown suspended by a cable 611 in a borehole 600 (having mud cake 607) traversing a formation 605. The wireline tool 610 is provided with an insulated sonde 616 on which an array of electrodes 618-1, 618-2, 618-3 . . . including a reference electrode 618-R, and associated preferably high impedance voltage measuring circuits are provided. The electrodes are preferably coated with a semi-porous material such as cement. In addition, tool 610 includes one or more preferably retractable arms 631 on which one or more cutting edges 635 are mounted. The cutting edges 635 are designed to cut slits across the mudcake 607 as the wireline tool is moved through the borehole. The cutting edges may be made with a polycrystalline diamond compound (PDC). Because there is a large overbalancing pressure difference between the formation and the borehole (most of the pressure difference exists across the mudcake), after the cutting edges 635 slit the mudcake 607, a new mudcake will quickly build up in the slit to stop the fluid flow. In the mean time, a pressure transient has been created in the formation 605. In wells drilled with oil-based mud, streaming potential transients will be created if the mud has a water fraction.

As will be appreciated by those skilled in the art, the electrodes 618 move with the tool 610 in a continuous logging mode. Different electrodes in the array sense the streaming potential transient at a fixed spatial point. The spacing between the electrodes in the array and the logging speed determines the temporal sampling rate of the streaming potential transient. The top electrode 618-R is used as the voltage reference electrode, as it is farthest from the cutting edges and no streaming potential transient has yet been created there. Wires connecting the electrodes, measuring electronics, and telemetry are provided but not shown in FIG. 23.

As previously mentioned, the arms 631 are preferably retractable. As a result, the cutting edges 635 can be retracted where streaming potential information is not desired, and the tool used for repeated runs to acquire streaming potential data over long period of time, if desired. A gamma ray detector 640 is provided in order to help align data from repeat runs.

As was discussed above with reference to the LWD tool 510, streaming potential measurements are passive voltage measurements which can be made in a highly resistive borehole by using high impedance electronics. In wells drilled with oil-based mud (without a water fraction), the electrodes are preferably relatively large (by way of example and not limitation, twelve inches by two inches) and are preferably placed on articulated pads (not shown) or on a skid sonde to insure close contact with the formation.

Using the wireline tool 610, the spurt loss from the cutting of mudcake is likely to happen over a short time period compared with the time needed for the pressure transient to diffuse beyond the invaded zone. If that is the case, then the source of the streaming potential transient created by the cutting of mudcake can be treated as a delta function of time. The inversion of the data for a short period of time can be carried out without any input from the mudcake build-up model. After the spurt loss, the mudcake will build back up by a static process. The thickness of the mudcake will increase with the square root of time. The inversion of streaming potential data over a longer period of time with a mudcake that increases with the square root of time is still quite robust.

The mud invasion is a continual process even with a good mud system. The streaming potential transients created by the mud invasion are likely to be measurable when the logging time is not too far away from the time when the well is drilled or reamed. Thus, the tool shown in FIG. 23 with the cutting edges retracted (or without the arms and cutting edges) can record the streaming potential created by the previous drilling and/or reaming, and the continual mud invasion. In such a situation, a model for a long measuring period and a mudcake build-up will be utilized for interpreting the streaming potential data collected. Thus, it will be appreciated that the wireline streaming potential tool can be used with appropriate modeling and inversion to provide measurements of formation permeability in the invaded zone, beyond the invaded zone, and in the far zone, continuously along the borehole. The transients acquired over long periods of time without the cutting blade will help to determine the permeability in the far zone.

Figure 23A:
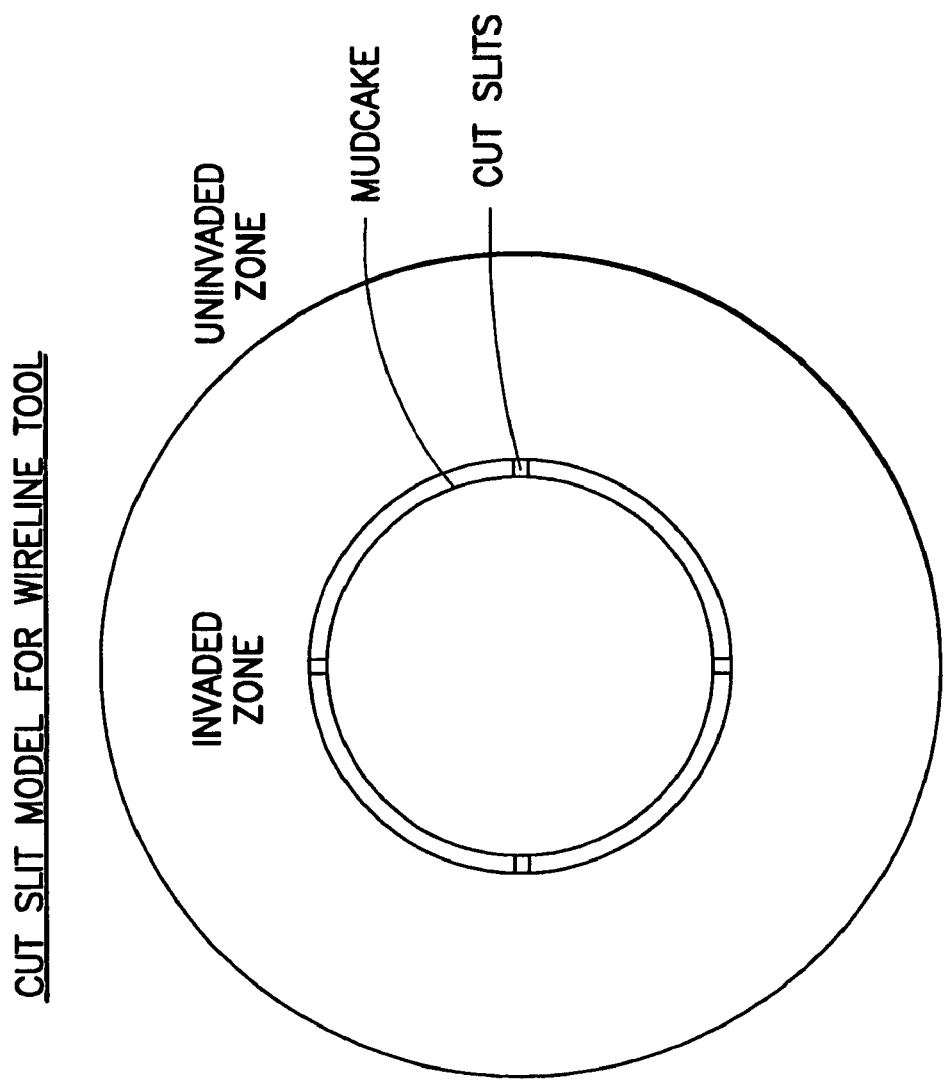
FIG. 23a is a schematic representing a forward model of a wireline tool which is adapted to slit borehole mudcake.

The ability of the wireline tool of FIG. 23 to detect streaming potential transients and provide qualitative determinations is supported by the forward model of FIG. 23a and the results of the model shown in FIGS. 23b-23e. It is assumed in the model of FIG. 23a, that the spurt loss from the cutting of mudcake happened over a short time period compared with the time needed for the pressure transient to diffuse beyond the invaded zone. The source of the streaming potential transient created by the cutting of mudcake was treated as a delta function of time. After the spurt loss, it was assumed that a new mudcake stopped all further flow.

FIG. 23b shows that the early time transients are insensitive to the uninvaded zone. It takes a time interval given by equation (4) for the pressure transient to diffuse to the uninvaded zone. FIG. 23c shows that both early time streaming potential and late time streaming potential are sensitive to the permeabilities of the invaded zone. The fact that early time data and late time data are sensitive to permeabilities of different zones makes the inversion algorithm quite robust.

FIG. 23d shows the dependence of the streaming potential on the thickness of the invaded zone. Equation (4) shows that the time it takes for the pressure transient to diffuse through the invaded zone depends on the invaded zone thickness $\Delta$ and invaded zone permeability k through the combination $\Delta^2/k$. Equation (8) shows that in approaching the steady state, the streaming potential from the invaded zone depends on $\Delta$ and k through the combination $\Delta/k$. The difference between these two combinations suggests that the thickness and the permeability of the invaded zone can be individually determined by inversion.

Figure 23E:
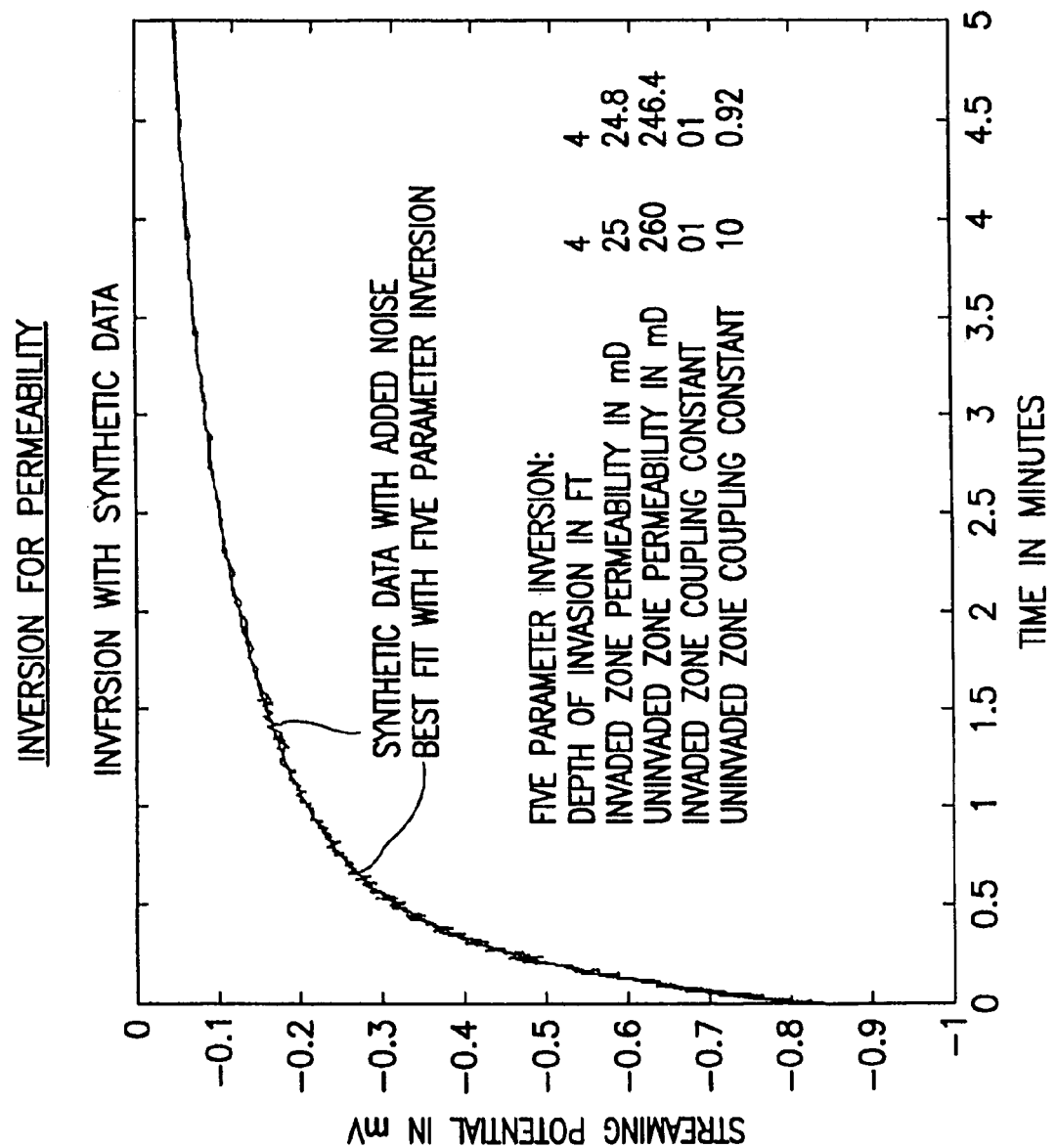
FIG. 23e is a plot which shows an inversion for permeability of synthetic data and a best fit for a five parameter model.

The results of inversion with synthetic data calculated from the forward model and 5% added noise are shown in FIG. 23e. The inverted values of the invaded zone permeability, uninvaded zone permeability, and the thickness of the invaded zone all agree very well with the input values used in the forward model.

There have been described and illustrated herein several embodiments of apparatus and methods for measuring streaming potentials and characterizing earth formation characteristics therefrom. While particular embodiments of the invention have been described, it is not intended that the invention be limited thereto, as it is intended that the invention be as broad in scope as the art will allow and that the specification be read likewise. Thus, while particular tools and electrode arrangements have been disclosed, it will be appreciated that modifications can be made, provided the tool or arrangement includes an electrode array capable of measuring streaming potentials. Thus, for example, the invention could be modified so that a two-dimensional array of electrodes can be utilized in certain circumstances in order to provide azimuthal streaming potential information. It will therefore be appreciated by those skilled in the art that yet other modifications could be made to the provided invention without deviating from its spirit and scope as claimed.

What is claimed is:

1. In a completed well traversing an earth formation, an improvement comprising:
   a) an array of at least partially insulated electrodes spaced along and fixed relative to the completed well and adapted to measure transient streaming potential voltage signals representative of transient pressure variations adjacent said electrodes; and
   b) a processor means coupled to said array of at least partially insulated electrodes, said processor means for generating an indication of a parameter of the earth formation utilizing indications of said transient streaming potential voltage signals;
   wherein said completed well includes a wellbore having sand screen sections about the wellbore, insulated joint sections between said sand screen sections, said at least partially insulated electrodes being electrodes located about said insulated joint sections.

2. The improvement of claim 1, wherein:
   said earth formation includes a plurality of zones, at least a first zone of said plurality of zones being substantially fluidly isolated from a second zone of said plurality of zones, and said array of at least partially insulated electrodes includes a plurality of electrodes in said first zone and a plurality of electrodes in said second zone.

3. The improvement of claim 2, wherein:
at least one of said plurality of electrodes in said second zone is used as a reference electrode for said plurality of electrodes in said first zone.

4. The improvement of claim 1, wherein:
said indication of a parameter of the earth formation is selected from the group including at least one indication of formation permeability and at least one indication of formation fracture.

5. The improvement of claim 4, wherein:
said indication of a parameter of the earth formation comprises a plurality of indications of formation permeability adjacent said electrodes.

6. The improvement according to claim 5, wherein:
said indications of formation permeability are qualitative indications.

7. The improvement according to claim 4, wherein:
said indication of a parameter of the earth formation is a location of an earth formation fracture.

8. The improvement of claim 1, wherein:
said completed well includes centralizers about said insulated joint sections, said electrodes located on or integrated with said centralizers.

9. The improvement of claim 1, wherein:
said electrodes are coated with a semi-porous coating.

10. The improvement of claim 9, wherein:
said semi-porous coating is one of cement, ceramic, and clay.

11. The improvement of claim 1, wherein:
said completed well includes a well bore having a metal casing about which electrical insulation is located, said at least partially insulated electrodes being electrodes located in said electrical insulation, said electrical insulation being cemented in the formation with cement, and said cement, said electrical insulation, and said casing being perforated.

12. The improvement of claim 11, wherein:
said indication of a parameter of the earth formation comprises a plurality of indications of formation permeability adjacent said electrodes.

13. The improvement according to claim 12, wherein:
said indications of formation permeability are qualitative indications.

14. The improvement according to claim 11, wherein:
said indication of a parameter of the earth formation is a location of an earth formation fracture.

15. The improvement of claim 1, wherein:
said completed well includes an insulated tubing running through the well and a plurality of conductive casing sections coupled by electrically insulating sections which are cemented in the well, said at least partially insulated electrodes being electrodes located on said plurality of conductive casing sections.

16. The improvement of claim 15, wherein:
said indication of a parameter of the earth formation comprises a plurality of indications of formation permeability adjacent said electrodes.

17. The improvement according to claim 16, wherein:
said indications of formation permeability are qualitative indications.

18. The improvement according to claim 15, wherein:
said indication of a parameter of the earth formation is a location of an earth formation fracture.

* * * * *